(12) United States Patent
Sudo et al.

(10) Patent No.: US 8,458,424 B2
(45) Date of Patent: Jun. 4, 2013

(54) STORAGE SYSTEM FOR REALLOCATING DATA IN VIRTUAL VOLUMES AND METHODS OF THE SAME

(75) Inventors: Azusa Sudo, Kawasaki (JP); Yoshiaki Eguchi, Yokohama (JP); Masayuki Yamamoto, Sagamihara (JP); Yoichi Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 12/864,973

(22) PCT Filed: Feb. 8, 2010

(86) PCT No.: PCT/JP2010/000727
§ 371 (c)(1),
(2), (4) Date: Jul. 28, 2010

(87) PCT Pub. No.: WO2011/096017
PCT Pub. Date: Aug. 11, 2011

(65) Prior Publication Data
US 2011/0197044 A1 Aug. 11, 2011

(51) Int. Cl.
*G06F 12/00* (2006.01)
(52) U.S. Cl.
USPC .............. 711/165; 711/6; 711/156; 711/170; 711/173
(58) Field of Classification Search
USPC .................. 711/6, 156, 170, 173, 165
See application file for complete search history.

(56) References Cited

U.S. PATENT DOCUMENTS

| | | | |
|---|---|---|---|
| 7,373,670 B2 * | 5/2008 | Mimatsu et al. | 726/27 |
| 2003/0140207 A1 * | 7/2003 | Nagase et al. | 711/167 |
| 2006/0143418 A1 | 6/2006 | Takahashi et al. | |
| 2006/0156060 A1 * | 7/2006 | Forrer et al. | 714/6 |
| 2008/0104350 A1 | 5/2008 | Shimizu et al. | |
| 2008/0201542 A1 * | 8/2008 | Maruyama et al. | 711/165 |
| 2009/0070541 A1 | 3/2009 | Yochai | |
| 2009/0254719 A1 | 10/2009 | Sasage | |

FOREIGN PATENT DOCUMENTS

| | | |
|---|---|---|
| JP | 2006-099748 | 4/2006 |
| JP | 2008-112276 | 5/2008 |
| JP | 2009-251751 | 10/2009 |

* cited by examiner

*Primary Examiner* — Reginald Bragdon
*Assistant Examiner* — Gurtej Bansal
(74) *Attorney, Agent, or Firm* — Brundidge & Stanger, P.C.

(57) ABSTRACT

A storage system comprises a virtual volume configured of multiple virtual areas and a pool configured of multiple actual area groups of different performances. The controller of the storage system manages which actual areas are assigned to which virtual areas and the access load on the actual areas assigned to the virtual areas. The controller, if the access load of a first actual area assigned to a first virtual area is inappropriate for a first actual area group comprising the first actual area, migrates data to a second actual area in a second actual area group which is appropriate for the access load of the first actual area from the first actual area. The controller performs data migration between actual areas for achieving data allocation at a certain point of time based on history information which is the information related to a virtual area at a point of time in the past and an actual area assigned to the virtual area. Data allocation is the allocation of data in a virtual area to an actual area in an actual area group.

13 Claims, 20 Drawing Sheets

PER-OPERATION PAGE MANAGEMENT TABLE

| OPERATION ID | VVOL NUMBER | VA NUMBER | REALLOCATION TYPE |
|---|---|---|---|
| OS1 | VVOL 100 | 1~20 | 1 (2009/02/05/09/50) |
| OS2 | VVOL 100 | 21~45 | 3 |
| OS3 | VVOL 200 | 1~250 | 2 (2010/03/05/09/50) |
|  | VVOL 201 | 1~232 | 0 |
| ... | ... | ... | ... |

TIER-MEDIA MANAGEMENT TABLE

| TIER NUMBER | MEDIA TYPE |
|---|---|
| 0 | SSD |
| 1 | SAS |
| 2 | SATA |

ACTUAL ALLOCATION HISTORY MANAGEMENT TABLE

OS 1

| TIME | VA NUMBER | TIER NUMBER |
|---|---|---|
| 2009/10/01 08:55 | 1 | 2 |
| | 2 | 2 |
| | 3 | 2 |
| | ... | ... |
| 2009/10/01 09:00 | 1 | 2 |
| | 2 | 2 |
| | 3 | 2 |
| | ... | ... |
| 2009/10/01 09:05 | 1 | 0 |
| | 2 | 0 |
| | 3 | 1 |
| | ... | ... |

OS 2

| TIME | VA NUMBER | TIER NUMBER |
|---|---|---|
| 2009/10/01 08:55 | 21 | 2 |
| | 22 | 2 |
| | 23 | 2 |
| | ... | ... |
| 2009/10/01 09:00 | 21 | 2 |
| | 22 | 2 |
| | 23 | 2 |
| | ... | ... |
| 2009/10/01 09:05 | 21 | 1 |
| | 22 | 1 |
| | 23 | 1 |
| | ... | ... |

Fig. 7

PAGE PERFORMANCE MANAGEMENT TABLE

OS 1

| TIME | VA NUMBER | IOPS |
|---|---|---|
| 2009/10/01 08:55 | 1 | 7 |
| | 2 | 4 |
| | 3 | 5 |
| | ... | ... |
| 2009/10/01 09:00 | 1 | 25 |
| | 2 | 30 |
| | 3 | 17 |
| | ... | ... |
| 2009/10/01 09:05 | 1 | 24 |
| | 2 | 25 |
| | 3 | 16 |
| | ... | ... |

OS 2

| TIME | VA NUMBER | IOPS |
|---|---|---|
| 2009/10/01 08:55 | 21 | 7 |
| | 22 | 8 |
| | 23 | 3 |
| | ... | ... |
| 2009/10/01 09:00 | 21 | 15 |
| | 22 | 17 |
| | 23 | 13 |
| | ... | ... |
| 2009/10/01 09:05 | 21 | 13 |
| | 22 | 14 |
| | 23 | 16 |
| | ... | ... |

Fig. 8

TIER DETERMINATION CRITERIA TABLE

| TIER NUMBER | TIER DETERMINATION CRITERIA (IOPS) |
|---|---|
| 0 | 20~ |
| 1 | 10~19 |
| 2 | 0~9 |

Fig. 9

IDEAL TIER MANAGEMENT TABLE

OS 1

| TIME | VA NUM-BER | IDEAL TIER NUM-BER |
|---|---|---|
| 08:55 | 1 | 2 |
|  | 2 | 2 |
|  | 3 | 2 |
|  | ... | ... |
| 09:00 | 1 | 0 |
|  | 2 | 0 |
|  | 3 | 1 |
|  | ... | ... |
| 09:05 | 1 | 0 |
|  | 2 | 0 |
|  | 3 | 1 |
|  | ... | ... |

OS 2

| TIME | PAGE NUM-BER | IDEAL TIER NUM-BER |
|---|---|---|
| 08:55 | 21 | 2 |
|  | 22 | 2 |
|  | 23 | 2 |
|  | ... | ... |
| 09:00 | 21 | 1 |
|  | 22 | 1 |
|  | 23 | 1 |
|  | ... | ... |
| 09:05 | 21 | 1 |
|  | 22 | 1 |
|  | 23 | 1 |
|  | ... | ... |

Fig. 10

REALLOCATION PERFORMANCE MANAGEMENT TABLE

| REALLOCATION DIRECTION | REALLOCATION PERFORMANCE |
|---|---|
| 2→0 | 50 MB/sec |
| 2→1 | 50 MB/sec |
| 1→0 | 80 MB/sec |
| ... | ... |

Fig. 11

REALLOCATION TIME MANAGEMENT TABLE

| TIME | REALLOCATION DIRECTION (UP) | NUMBER OF VAS | REALLOCATION TIME (SEC) |
|---|---|---|---|
| 09:00 | 2→0 | 20 | 600 |
|  | 2→1 | 10 | 300 |
|  | 1→0 | 7 | 160 |
| 09:05 | 2→0 | 0 | 0 |
|  | 2→1 | 0 | 0 |
|  | 1→0 | 0 | 0 |
| ... | ... | ... | ... |

Fig. 12

REALLOCATION START TIME MANAGEMENT TABLE

| REALLOCATION START TIME | REALLOCATION DIRECTION | VA NUMBER |
|---|---|---|
| 08:50 | 2→0 | 1,2, ... |
| 08:55 | 2→1 | 3,...,21,22,23 |
| ... | ... | ... |

Fig. 13

MAPPING TABLE

POOL MANAGEMENT TABLE

PERFORMANCE TREND TABLE

OS 1

| TIME | VA NUMBER | AVERA-GE IOPS |
|---|---|---|
| 08:55 | 1 | 3 |
|  | 2 | 4 |
|  | 3 | 5 |
|  | ... | ... |
| 09:00 | 1 | 25 |
|  | 2 | 30 |
|  | 3 | 17 |
|  | ... | ... |
| 09:05 | 1 | 24 |
|  | 2 | 25 |
|  | 3 | 16 |
|  | ... | ... |

OS 2

| TIME | VA NUMBER | AVERA-GE IOPS |
|---|---|---|
| 08:55 | 21 | 7 |
|  | 22 | 8 |
|  | 23 | 3 |
|  | ... | ... |
| 09:00 | 21 | 15 |
|  | 22 | 17 |
|  | 23 | 13 |
|  | ... | ... |
| 09:05 | 21 | 13 |
|  | 22 | 14 |
|  | 23 | 16 |
|  | ... | ... |

Fig. 25

STORAGE SYSTEM FOR REALLOCATING DATA IN VIRTUAL VOLUMES AND METHODS OF THE SAME

TECHNICAL FIELD

This invention relates to data reallocation in virtual volumes.

BACKGROUND ART

Currently, in companies, along with the increase of data amount, storage systems are becoming larger in scale and complexity. Therefore, companies demand simplifying the management and improving the use efficiency of storage apparatuses. One of the technologies for satisfying this demand is Thin Provisioning. This is the technology in which a storage system provides a virtual logical volume which does not comprise a physical storage area (hereinafter referred to as a virtual volume) to a host computer and, in accordance with the write from the host computer to the virtual volume, dynamically assigns pages from a pool. At this point, a "pool" is a set of multiple pages, and a "page" is a physical storage area.

By this technology, the capacity of the storage system can be made more efficient and the capacity design can be simplified.

Generally, a pool is configured of media (a page group) of the same performance. However, usually, the access frequencies of multiple pages assigned to a virtual volume are not the same, and there are some cases in which, in those multiple pages, pages with high access frequencies and pages with low access frequencies are mixed. Therefore, excess or deficiency of the performance might occur. As more specifically described, for example, if a pool is configured only of high-performance media, excessive performance occurs in the pages whose access frequencies are low while, if a pool is configured only of low-performance media, performance deficiency occurs in the pages whose access frequencies are high.

As a method for solving the problem, the method described in the Patent Literature 1 can be considered. According to the Patent Literature 1, one pool is configured of multiple media of different performances, and data in a page is reallocated from the medium comprising the page to the medium which is the optimum for the access frequency of the page.

CITATION LIST

Patent Literature

PTL 1: US 2009/0070541, Description

SUMMARY OF INVENTION

Technical Problem

According to the Patent Literature 1, a change in the access frequency of a page is detected, and data reallocation is performed after the detection. Therefore, it takes time since the access frequency of the page changes until the data in the page is reallocated to the medium which is the optimum for the access frequency after the change. That is, a situation in which data allocation is not optimum occurs.

Therefore, the purpose of this invention is reducing the probability that the situation in which data allocation is not optimum will occur.

Solution to Problem

A storage system comprises a virtual volume which is a virtual logical volume configured of multiple virtual areas (virtual storage areas) and a pool which is a storage area configured of multiple actual area groups of different performances. The controller of the storage system manages which actual areas (physical storage areas) are assigned to which virtual areas and the access load on the actual areas assigned to the virtual areas. The controller, if the access load of a first actual area assigned to a first virtual area is inappropriate for a first actual area group comprising the first actual area, migrates data to a second actual area in a second actual area group which is appropriate for the access load of the first actual area from the first actual area, and assigns the second actual area, instead of the first actual area, to the first virtual area. The controller performs data migration between actual areas for achieving data allocation at a certain point of time based on history information which is the information related to a virtual area at a point of time in the past and an actual area assigned to the virtual area. Data allocation is the allocation of data in a virtual area to an actual area in an actual area group.

The storage system may be configured of one or multiple storage apparatuses. The controller may be in a device comprising storage devices as the base of the pool, or may also be outside the device comprising the storage devices as the base of the pool. The controller may be a server or may also be an intelligent switch.

Advantageous Effects of Invention

The probability that the situation in which data allocation is not optimum will occur can be reduced.

BRIEF DESCRIPTION OF DRAWINGS

FIG. 5 shows an operation management table 237.
FIG. 6 shows a tier-media management table 238.
FIG. 7 shows an actual allocation history management table 239.
FIG. 8 shows a page performance management table 240.
FIG. 9 shows a tier determination criteria table 241.
FIG. 10 shows an ideal tier management table 242.
FIG. 11 shows a reallocation performance management table 243.
FIG. 12 shows a reallocation time management table 244.
FIG. 13 shows a reallocation start time management table 245.

FIG. 25 shows an example of performance trend information created in the ideal tier determination processing.

DESCRIPTION OF EMBODIMENTS

An embodiment of this invention is described below.

Note that, though the description below describes various types of information using the term of "a xxx table," the various types of information may also be expressed by other data structures than tables. For showing the independence of the data structure, "a xxx table" can be referred to as "xxx information."

Furthermore, the description below might be described with a "program" as a subject, as the program performs the specified processing by being performed by a processor (e.g. a CPU (Central Processing Unit)) while appropriately using a storage resource (e.g. memory) and a communication interface device (e.g. a communication port), the description with the processor as a subject of the processing may also be permitted. The processor may also be permitted to comprise dedicated hardware in addition to the CPU. The computer program may also be installed by a program source to the respective computers. The program source, for example, may also be a program distribution server or a storage medium.

Furthermore, while respective components (e.g. pages) can be identified by IDs or numbers, other types of identification information such as names, if identifiable information, may also be used.

Hereinafter, with reference to the figures, an embodiment of this invention is described. In the figures below, the same reference signs are added to the same parts. However, this invention is not limited to this embodiment, and all variations complying with the concept of this invention are included in the technical scope of this invention. Furthermore, unless otherwise specified, the respective components may be plural or may also be singular.

Figure 1:
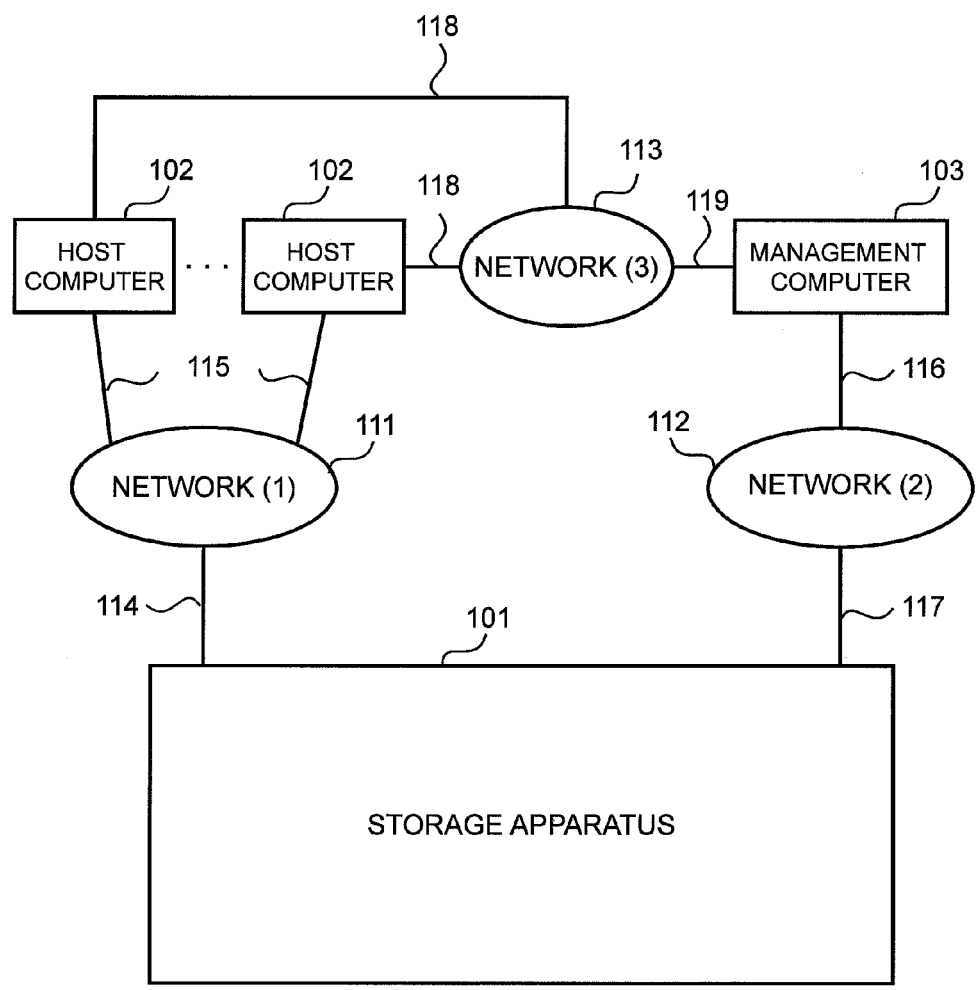
FIG. 1 shows the entire configuration of a computer system related to an embodiment of this invention.

FIG. 1 shows the entire configuration of a computer system related to an embodiment of this invention.

This storage system, for example, comprises one or multiple storage apparatuses 101, one or multiple host computers 102, and one or multiple management computers 103.

The storage apparatus 101 and the host computer 102 are connected, for example, via a network (1) 111.

The storage apparatus 101 and the management computer 103 are connected, for example, via a network (2) 112.

The host computer 102 and the management computer 103 are connected, for example, via a network (3) 113.

The storage apparatus 101 is connected to the network (1) 111 via a communication line 114.

The host computer 102 is connected to the network (1) 111 via a communication line 115.

The management computer 103 is connected to the network (2) via a communication line 116.

The storage apparatus 101 is connected to the network (2) via a communication line 117.

The host computer 102 is connected to the network (3) 113 via a communication line 118.

The management computer 103 is connected to the network (3) 113 via a communication line 119.

Note that the above-mentioned communication lines from 114 to 119 are configured, for example, as wired line such as metal cables or optical fiber cables. However, it is also possible to wirelessly connect the host computer 102 and the storage apparatus 101, the storage apparatus 101 and the management computer 103, and the host computer 102 and the management computer 103. In this case, the communication lines from 114 to 119 are omitted.

Furthermore, at least two of the network (1) 111, the network (2) 112, and the network (3) 113 may also be a common network. Respective networks 111, 112, and 113 are communication networks, for example, SAN (Storage Area Network) or LAN (Local Area Network).

Figure 2:
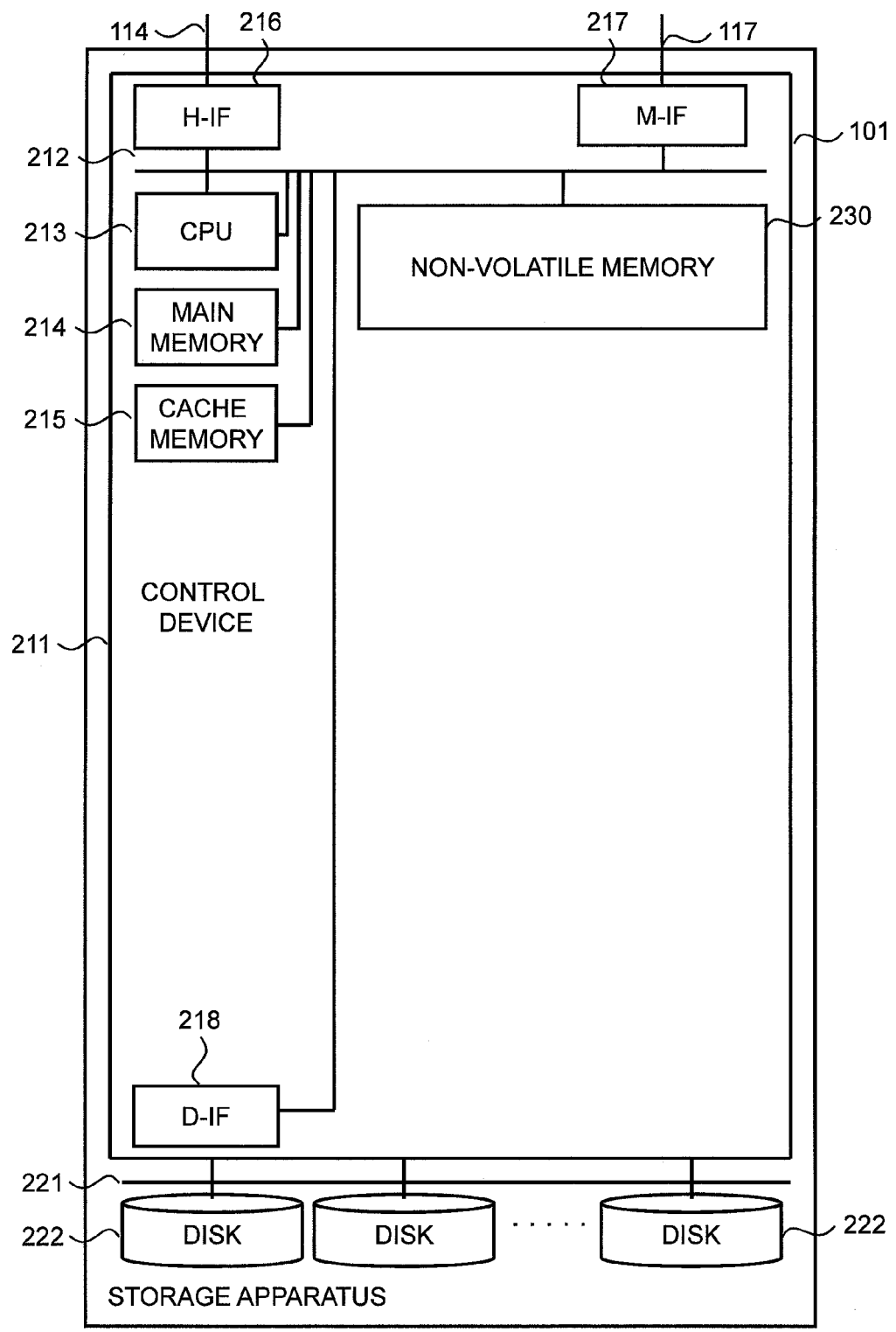
FIG. 2 shows the configuration of a storage apparatus 101.

FIG. 2 shows the configuration of the storage apparatus 101.

The storage apparatus 101 can be broadly classified into a control device 211 and multiple disks 222.

In this embodiment, the multiple disks 222 include, at least, SSDs (Solid State Drives), SAS (Serial Attached SCSI)-HDDs (Hard Disk Drives), and SATA (Serial Advanced Technology Attachment)-HDDs. However, the disks 222, instead of or in addition to at least one of the same, may also be other types of physical storage devices.

The disks 222 are connected to the control device 211 via a communication line 221 such as Fibre Channel cable. Note that, in the multiple disks 222, one or multiple RAID (Redundant Array of Independent Disks) groups can be configured.

Next, the configuration of the control device 211 is described below.

The control device 211, in accordance with commands received from the host computer 102, controls data write and read to and from the disks 222. The control device 211 provides virtual volumes (hereinafter referred to as VVOLs) complying with Thin Provisioning. A VVOL is configured of multiple virtual areas. A virtual area is a virtual storage area and is expressed, for example, by an LBA (Logical Block Address).

The control device 211 comprises, for example, storage resources, communication interface devices (interface devices are hereinafter abbreviated to "IFs"), and a CPU (Central Processing Unit) 213 connected to the same. The storage resource, for example, comprises a non-volatile memory 230, a main memory 214, and a cache memory 215.

A non-volatile memory 230 is, for example, a rewritable non-volatile memory such as a flash memory.

Figure 22:
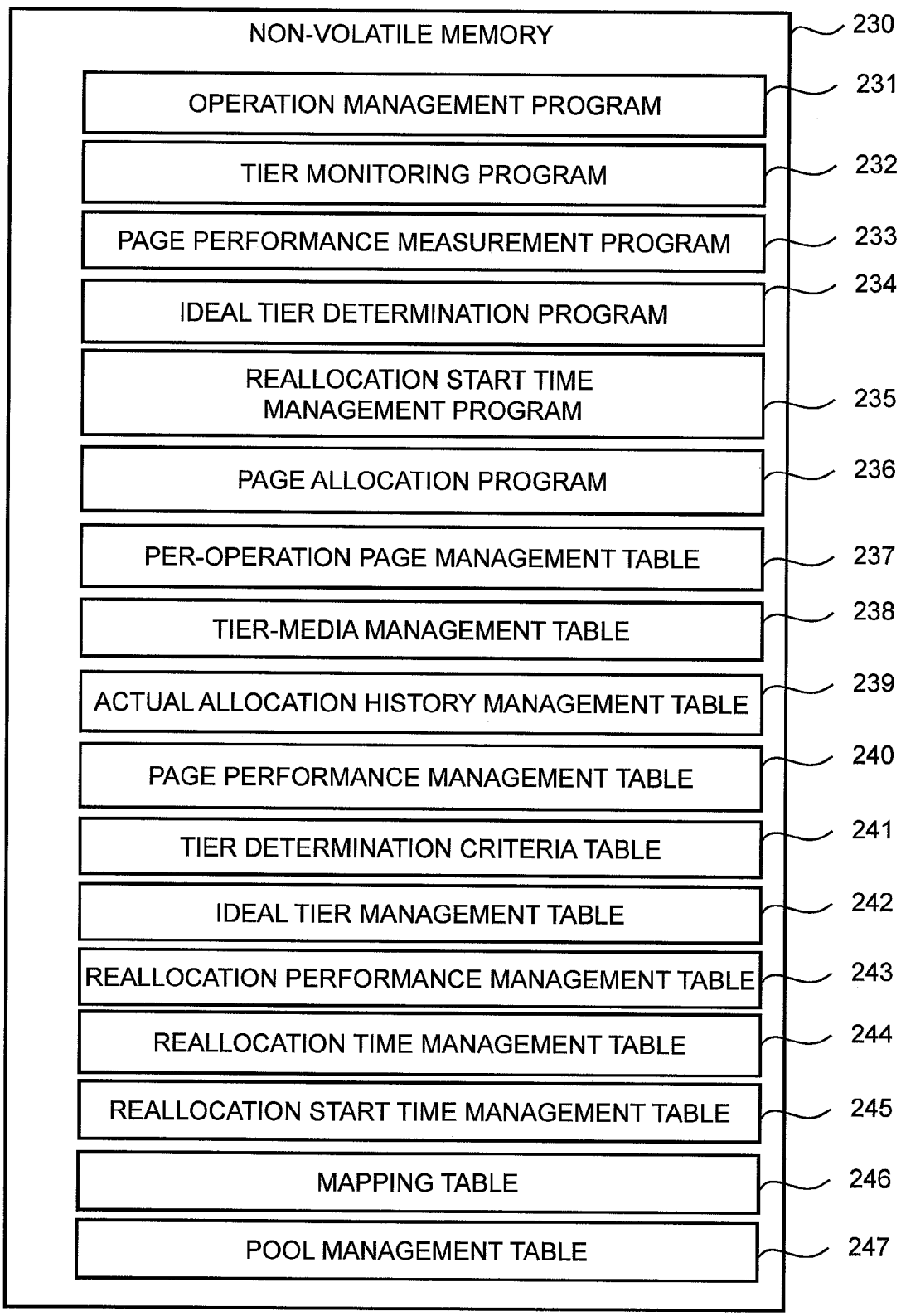
FIG. 22 shows programs and information in a non-volatile memory 230.

The non-volatile memory 230 stores computer programs and information. As more specifically described, for example, as shown in FIG. 22, the non-volatile memory 230 stores an access control program 231, a tier monitoring program 232, a page performance measurement program 233, an ideal tier determination program 234, a reallocation start time management table 235, a page allocation program 236, an operation management table 237, a tier-media management table 238, an actual allocation history management table 239, a page performance management table 240, a tier determination criteria table 241, an ideal tier management table 242, a reallocation performance management table 243, a reallocation time management table 244, a reallocation start time management table 245, a mapping table 246, and a pool management table 247. The respective programs 231 to 236 are transferred from the non-volatile memory 230 to the main memory 214, and performed by the CPU 213.

The access control program 231 receives an access command from the operation of the host computer 102 (the operating system (OS) in this embodiment), and processes the access command. The processing performed by this program 231 is described later.

The tier monitoring program 232 regularly checks (monitors) the actual allocation (actual data allocation) showing from what tier to what virtual area pages are assigned, and records the result of the check to the actual allocation history management table 239.

The page performance measurement program 233 monitors to the page assigned to which virtual area the access was made, and records the access frequency of the accessed page to the page performance management table 240.

The ideal tier determination program 234, with reference to the page performance management table 239 and the tier determination criteria table 241, for each point of time, determines the ideal tier for the page, and records the result of the determination to the ideal tier management table 242.

The reallocation start time management program 235, with reference to the ideal tier management table 242 and the reallocation performance management table 243, for each point of time, ascertains the number of migration source pages and the reallocation time, and records the result to the reallocation time management table 244. Furthermore, the program 235, with reference to the reallocation time management table 244, ascertains the reallocation start time, and records the result to the reallocation start time management table 245.

The page allocation program 236 performs the reallocation processing. In this embodiment, there are four types of reallocation processing, which are the reallocation processing 0, 1, 2, and 3. Note that the "reallocation processing" referred to in this embodiment indicates migrating data from pages in a certain tier to pages in another tier. In that process, to the virtual area assigned to the migration source pages, instead of the migration source pages, migration destination pages are assigned.

The operation management table 237 shows what operation (OS) can access what virtual area in what VVOL. The details of this table 237 are described later with reference to FIG. 5.

The tier-media management table 238 shows what type of tier is configured of what media. The details of this table 238 are described later with reference to FIG. 6.

The actual allocation history management table 239 shows the history of what the actual allocation was at what point of time. The details of this table 239 are described later with reference to FIG. 7.

The page performance management table 240 shows what the access frequencies were for the pages assigned to what virtual pages in what time zones. The details of this table 240 are described later with reference to FIG. 8.

The tier determination criteria table 241 shows to what tiers the data in the pages of what access frequencies should be allocated. The details of this table 241 are described later with reference to FIG. 9.

The ideal tier management table 242 shows what types of data allocation are ideal by points of time. As more specifically described, for example, the table 242 shows the data in the pages assigned to what virtual areas should be ideally allocated in what tiers at what point of time. The details of this table 242 are described later with reference to FIG. 10.

The reallocation performance management table 243 shows the relationship between the direction and the performance of reallocation. The details of this table 243 are described later with reference to FIG. 11.

The reallocation time management table 244 shows the relationship among the direction of reallocation, the number of pages, and the time required for reallocation by point of time. The details of this table 244 are described later with reference to FIG. 12.

The reallocation start time management table 245 shows in what tiers the data in what pages should be allocated at what point of time. The details of this table 245 are described later with reference to FIG. 13.

The mapping table 246 shows what pages are assigned to what virtual areas. The details of this table 246 are described later with reference to FIG. 23.

The pool management table 247 shows what pages are included in what tiers, of what access frequencies, and whether the pages are being used or unused. The details of this table 247 are described later with reference to FIG. 24.

FIG. 2 is referred to again.

In the main memory 214, as needed, the respective programs 231 to 236 stored in the non-volatile memory 230 are read. By the CPU 213 performing the respective programs 231 to 236 read in the main memory 214, various types of processing described later are performed.

The cache memory 215 temporarily stores the data received from the host computer 102 and the data read from the disks 222.

The host IF 216 is connected to the host computer 102 via the communication line 114, the network (1) 111, and the communication line 115. By the host IF 216, access commands (write commands or read commands) are received.

The management IF 207 is connected to the management computer 103 via the communication line 117, the network (2) 112, and the communication line 116. The management IF 207 is, for example, an NIC (Network Interface Card).

The disk IF 218 transmits and receives data to and from the respective disks 222. The disk IF 218 is connected to the respective disks 222 respectively via the communication path 221.

The basic operations of the storage apparatus 101 are simply described.

If receiving a write command from the host computer 102, the control device 211 stores the write data received from the host computer 102 in the cache memory 215. The control device 211 writes the write data stored in the cache memory 215 to the disks 222 via the disk IF 218. Note that the control device 211 may be configured, once the write data is stored in the cache memory 215, to notify the completion of the write command processing to the host computer 102 or may also be configured, once the write data is written to the disks 222, to notify the completion of the write command processing to the host computer 102.

If receiving a read command from the host computer 102, the control device 211 checks whether the data complying with the read command (read target data) is stored in the cache memory 215 or not. If the read target data is stored in the cache memory 215, the control device 211 reads the data from the cache memory 215, and transmits the same to the host computer 102 via the host IF 216. If the read target data is not stored in the cache memory 215, the control device 211 reads the read target data from one or more disks 222 via the disk IF 218, and stores the data in the cache memory 215. Then, the control device 211 transmits the read target data stored in the cache memory 215 to the host computer 102 via the host IF 216.

Figure 3:
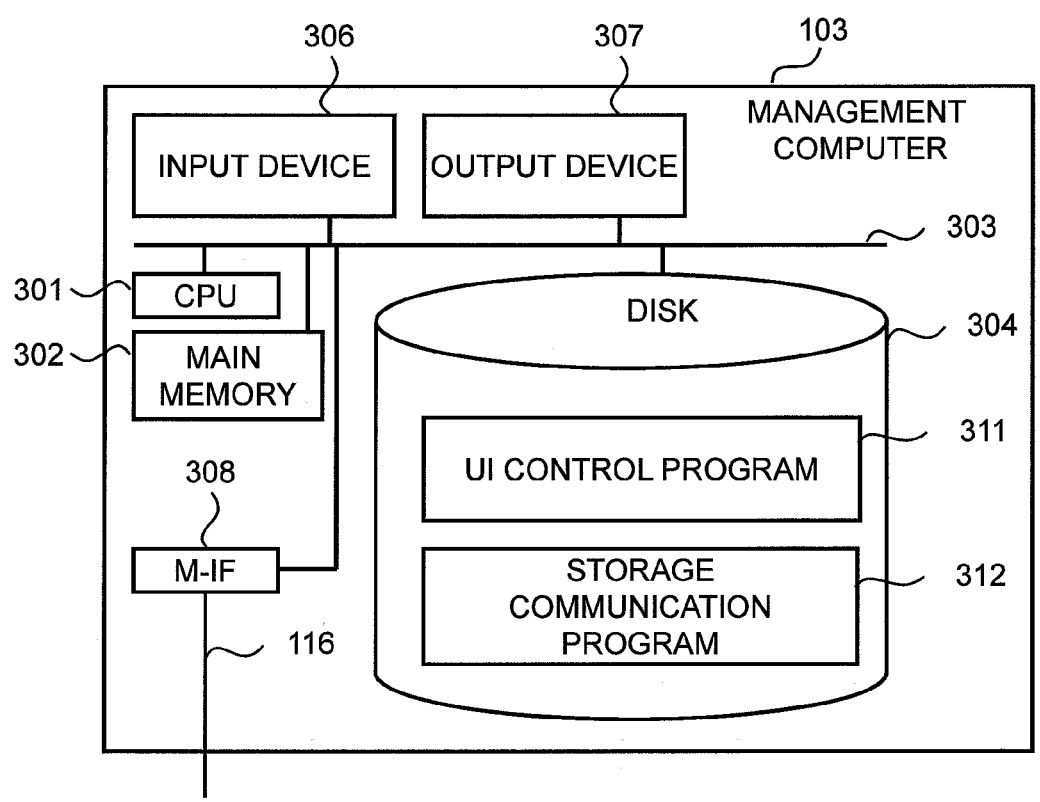
FIG. 3 shows the configuration of a management computer 103.

FIG. 3 shows the configuration of the management computer 103.

The configuration of the management computer 103 is the same as the general configuration. For example, the management computer 103 comprises a storage resource, a communication interface device, an input device 306, an output device 307, and a CPU 301 connected to the same. The communication interface device is a management IF 308. The storage resource, for example, comprises a main memory 302 and a disk 304. The CPU 301, the main memory 302, the disk 304, a pointing device 305, the input device 306, the output device 307, and the management IF 308 are mutually connected via the bus 303.

The input device 306 is, for example, a keyboard or a pointing device.

The output device 307 is, for example, a display device.

The disk 304 stores a UI (User Interface) control program 311 and a storage communication program 312.

To the main memory 302 from the disk 304, the UI control program 311 and the storage communication program 312 are loaded. The CPU 301, by performing the programs stored in the main memory 302, performs the UI control processing and the storage communication processing.

The UI control program 311 displays the page reallocation setting screen 1400 which is described later and other screens on the output device 307. Furthermore, the UI control program 311 stores the information input via the input device 306 by the administrator (or other users may also be permitted) in the main memory 302.

The storage communication program 312 communicates with the storage apparatus 101 via the network (2) 112. For example, this program 312 transmits the information input by the administrator to the storage apparatus 101 as needed.

The hardware configuration of the host computer 102 is the same as the general computer. That is, the host computer 102 comprises a communication interface device, a storage resource, and a CPU connected to the same. The communication interface device is, for example, a host bus adapter (HBA) for performing the communication via the network (1) 111 and the NIC for performing the communication via the network (3) 113. The storage resource, for example, comprises a memory.

Figure 4:
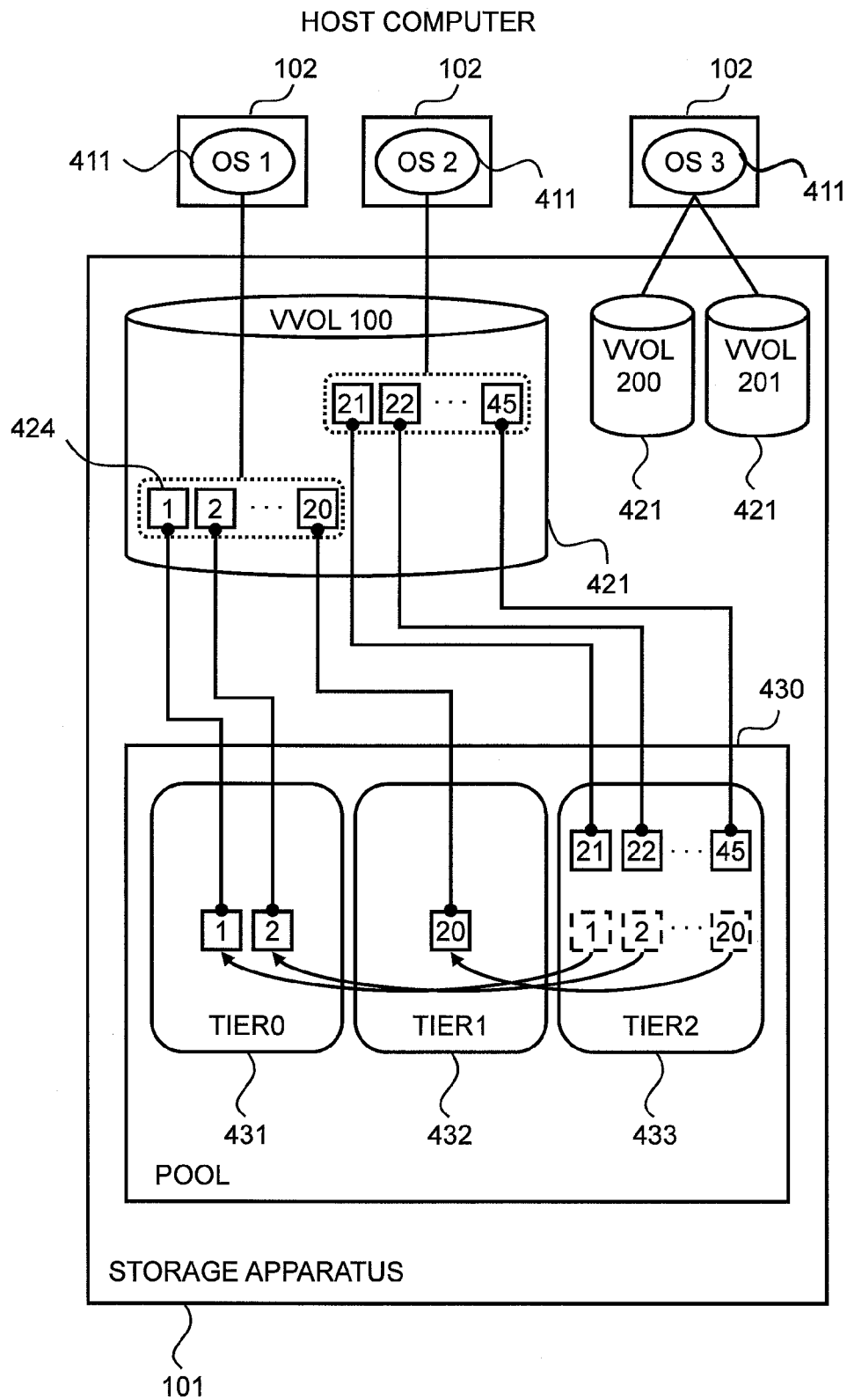
FIG. 4 shows the overview of the relation among operations, VVOLs and pages.

FIG. 4 shows the overview of the relationship among the operations, VVOLs and the pages.

As shown in FIG. 4, in this embodiment, the operation is an OS 411. Meanwhile, there is a VVOL 421, and the VVOL 421 is configured of multiple virtual areas 424. Furthermore, one pool 430 is configured of multiple tiers 431, and each tier 431 is configured of multiple pages 432. Hereinafter, in the description using FIG. 4, it is assumed that OSs 1 to 3 exist as OS's 411, that a VVOL 100, a VVOL 200, and a VVOL 201 exist as VVOLs, and that tiers 0 to 2 exist as tiers. Then, as the tier ID (number) is smaller, the performance is assumed to be higher.

According to FIG. 4, the OS 1 and the OS 2 existing in the separate host computers 102 share the VVOL 100. For example, the virtual areas 1 to 20 in the VVOL 100 are the range accessible from the OS 1, and the virtual areas 21 to 45 in the VVOL 100 are the range accessible from the OS 2.

The OS 3 existing in another host computer 102 uses the VVOLs 200 and 201. To the OS 3, all the areas (all the virtual areas) in the VVOLs 200 and 201 are accessible.

For example, to the respective virtual areas 21 to 45 in the VVOL 100, the pages 432 in the tier 2 are assigned. For example, the data in the virtual area 21 is actually stored in the pages assigned to the virtual area 21. The data stored in the pages is actually stored in one or more disks 222 which are the bases of the pages.

The pool 430 is configured of media of different performances, that is, the pool 430 comprises multiple tiers. The higher tier 0 is a media of high performance, the medium tier 1 is a media of medium performance, and the lower tier 2 is a media of low performance. Note that the number of tiers, not limited to three levels, may also be larger or smaller than three levels. Furthermore, there may also be multiple pools 430.

According to FIG. 4, for the virtual areas 1, 2, and 20, in the VVOL 100, data reallocation was performed. As more specifically described, for example, as shown by dashed lines, to the respective virtual areas 1 to 20, the pages 432 in the tier 2 were assigned, but the data reallocation was performed, and therefore, to the virtual area 20, instead of the pages 432 in the tier 2, the pages 432 in the tier 1 were assigned and, to the virtual areas 1 and 2, instead of the pages 432 in the tier 2, the pages 432 in the tier 0 were assigned. In this embodiment, page reallocation can be performed in units of operations (in units of OSs).

The overview of the relationship among the operations, VVOLs and the pages is as described above. Note that, as the operation, instead of or in addition to the OS, other types of access source such as an application program, a virtual computer, and another storage apparatus can be adopted.

Hereinafter, the respective tables stored in the non-volatile memory 230 of the storage apparatus 101 are described.

FIG. 5 shows the operation management table 237.

The operation management table 237, for example, for each operation, comprises the information below.

Operation ID 501: the ID of the operation (e.g. a guest OS).
VVOL number 502: the identification number of the VVOL.
VA number 503: the identification number of the virtual area (VA).

The virtual area may be identified by the LBA (Logical Block Address) or others.

Reallocation type 504: shows what type of reallocation processing should be performed. As more specifically described, [this type] shows which of the reallocation types 0 to 3 should be performed.

This table 237, for example, shows that only virtual areas 21 to 45 in the VVOL 100 are accessible from the OS 2 and, at the same time, for the virtual areas 21 to 45 which are accessible from the OS 2, the reallocation processing 3 is performed.

FIG. 6 shows the tier-media management table 238.

The tier-media management table 238, for example, for each tier, comprises the information below.

Tier number: the identification number of the tier.
Media type: shows the type of media configuring the tier.

This table 238 shows that the tier 0 is a set of SSD media (the media based on one or more SSDs), that the tier 1 is a set of SAS media (the media based on one or more SAS-HDDs), and that the tier 2 is a set of SATA media (the media based on one or more SATA-HDDs).

Note that the "media" referred to in this embodiment is a set of multiple pages.

Furthermore, the tier-media management table 238 may be created, for example, where a program defining the tier-media relationship is stored in the non-volatile memory 230 in the storage apparatus 101, by performing the program, or may also be created, for example, where the information showing the tier-media relationship is received from the management computer 103, by the storage apparatus 101 reading the information.

FIG. 7 shows the actual allocation history management table 239.

The actual allocation history management table 239, as shown in FIG. 7, exists for each operation. One table 239, for example, for each point of time, comprises the information below.

Time 701: the information showing the time of detecting the actual allocation.
VA number 702: the identification number of the virtual area.
Tier number 703: the identification number of tiers.

According to this table 239, the actual allocation is detected regularly (e.g. every five minutes). Furthermore, this table 239 shows that, at the point of time 2009/10/01/09/00 (nine o'clock on the first of October in the year 2009), the pages in the tier 2 were assigned to the virtual area 2.

Instead of preparing a table 239 for each operation, one [table 239] may also exist for all the operations. In that case, the table 239, in addition to the above-mentioned information 701 to 703, for example, comprises operational IDs.

FIG. 8 shows the page performance management table 240.

The page performance management table 240, as shown in FIG. 8, exists for each operation. One table 240, for each time zone, comprises the information below.

Time 801: shows the start time of the time zone.
VA number 802: the identification number of the virtual area.
IOPS 803: shows the IOPS (IO Per Second) of the page assigned to the virtual area. That is, in this embodiment, as the unit of the access frequency, IOPS is adopted. The unit of the access frequency, not limited to IOPS, may also be other units for the number of accesses per unit time. Furthermore, not limited to the access frequency, other types of information showing the access load (e.g. the amount of data transmitted and received to and from the pages per unit time) may also be recorded.

This table 240 shows that, in the time zone since 2009/10/01/09/00 until 2009/10/01/09/05 (not including 2009/10/01/09/05), the access frequency of the pages assigned to the virtual area 2 is 25 IOPS.

The page performance management table 240 is, in accordance with the page performance measurement program 233, updated complying with the access to the pages. For example, at 09:02 on the first of October in the year 2009, complying with a write command from the OS 1, if a write occurs in a page assigned to the virtual area 2, the page performance measurement program 233 updates the IOPS 803 corresponding to the time zone (since 2009/10/01/09/00 until 2009/10/01/09/05) to which the 09:02 on the first of October in the year 2009 belongs and the virtual area 2. Furthermore, the program 233, if exceeding the latest time zone recorded in the table 240, adds a row corresponding to a new time zone and, in the row, records the access frequency in the new time zone. According to the table 240 in FIG. 8, a row is added regularly (e.g. every five minutes). Note that the program 232, if the number of rows in the table 240 reaches the upper limit value which is previously specified, may delete one or more rows (e.g. the row corresponding to the oldest time zone).

Instead of preparing a table 240 for each operation, one [table 240] may also exist for all the operations. In that case, the table 240, in addition to the above-mentioned information 801 to 803, for example, comprises operational IDs.

FIG. 9 shows the tier determination criteria table 241.

The tier determination criteria table 241, for example, for each tier, comprises the information below.

Tier number 901: the identification number of the tier.
Tier determination criteria (IOPS) 902: shows the access frequency range appropriate for the tier (IOPS range). Note that, in this embodiment, the access frequency is measured as the access load of each page and therefore the tier determination criteria is defined as the access frequency range but, if other types of access load are measured, the tier determination criteria may also be defined as other types of access load ranges.

This table 241 shows that the data in the pages whose access frequencies belong to 10 to 19 IOPS should be allocated in the tier 1.

Note that the tier determination criteria table 241 may be created, for example, where a program defining the relationship between the tiers and the values to be the tier determination criteria is stored in the non-volatile memory 230 of the storage apparatus 101, by performing the program, or may also be created, for example, where the information showing the relationship between the tiers and the tier determination criteria is received from the management computer 103, by the storage apparatus 101 reading the information.

FIG. 10 shows the ideal tier management table 242.

The ideal tier management table 242, as shown in FIG. 10, exists for each operation. One table 242, for each point of time, comprises the information below.

Time 1001: shows the time. For example, the time 1001 corresponds to the hour and the minute at the point of time which the time 801 shows.
VA number 1002: the identification number of the virtual area.
ideal tier 1003: the identification number of the ideal tier.

This table 242 shows that, at 09:00, the pages in the tier 0 should ideally be assigned to the virtual area 2.

Instead of preparing a table 242 for each operation, one [table 242] may also exist for all the operations. In that case, the table 242, in addition to the above-mentioned information 1001 to 1003, for example, comprises operational IDs.

FIG. 11 shows the reallocation performance management table 243.

The reallocation performance management table 243, for example, for each direction of reallocation, comprises the information below.

Reallocation direction 1101: the information showing the migration source tier (media) and the migration destination tier. That is, in this embodiment, the "reallocation direction" indicates from what tier to what tier the data is migrated.
Reallocation performance 1102: the performance at reallocation, as more specifically described, for example, the data transfer rate of one page migration (the amount of data transferred in a unit of time (e.g. the units is MB/sec)). Note that "page migration" referred to in this embodiment indicates the data migration performed between the pages.

This table 243 shows that the performance (data transfer rate) at the page migration from the tier 2 (SATA media) to the tier 1 (SAS media) is 50 MB/sec.

Note that the reallocation performance management table 243 may be created, for example, where a program ascertaining the reallocation direction and the performance value of the same is stored in the non-volatile memory 230 of the storage apparatus 101, by performing the program, or may also be created, for example, where the information showing the relationship between the reallocation direction and the performance value of the same is received from the management computer 103, by the storage apparatus 101 reading the information.

FIG. 12 shows the reallocation time management table 244.

The reallocation time management table 244, for example, for each point of time, comprises the information below.

Time 1201: shows the point of time which is determined by the storage apparatus 101 and at which reallocation should be completed.
Reallocation direction (UP) 1202: shows the reallocation direction (UP). Note that the "reallocation direction (UP)" indicates that the performance of the data migration destination media is higher than the performance of the data migration source media. Meanwhile, the "reallocation direction (DOWN)" indicates that the performance of the data migration destination media is lower than the performance of the data migration source media. In the table 244, as the information 1202, as well as the reallocation direction (UP), the reallocation direction (DOWN) may also be recorded but, in this embodiment, only the reallocation direction (UP) is recorded. That is because, though this table 244 is used in the reallocation processing 3 described later (the processing of automatically migrating the data in the page to the ideal tier before the access frequency of the page changes), the problem with the change of the access frequency of the page is that the access performance might be deteriorated by the increase of the access frequency, and the decrease of the access frequency is considered to cause no problem about the access performance.

Number of VAs 1203: shows the total number of virtual areas to which the migration source page is assigned.

Reallocation time (sec) 1204: shows the length of time (unit: second) required for reallocation which is ascertained by the storage apparatus 101.

This table 244 shows that, for example, at 09:00, the data migration from 20 pages in the tier 2 to 20 pages in the tier 0 (that is, 20 sets of page migration) should be completed, and that the entire page migration takes 600 seconds.

FIG. 13 shows the reallocation start time management table 245.

The reallocation start time management table 245, for example, for each reallocation, comprises the information below.

Reallocation start time 1301: shows the time ascertained by the storage apparatus 101 at which the reallocation should be started.

Reallocation direction 1302: shows the reallocation direction.

VA number 1303: the list of numbers of the virtual areas to which the migration source pages are assigned.

This table 245 shows that the reallocation from the tier 2 to the tier 1 is started at 08:50 and, at the same time, that the target virtual areas related to the reallocation are virtual areas 3, ..., 21, 22, and 23. That is, the data in all the pages assigned to the virtual areas 3, ..., 21, 22, and 23 are migrated.

Furthermore, as is clear from this table 243 and the table 244 shown in FIG. 12, the reallocation start time for achieving the ideal data allocation at a certain point of time in the future might be different depending on the reallocation direction. That is because even at the same point of time 1201, depending on the reallocation direction 1202, the time length considered to be required for one set of page migration and the number of virtual areas listed in the VA number 1303 are different, and therefore, the reallocation time 1204 might be different.

Figure 23:
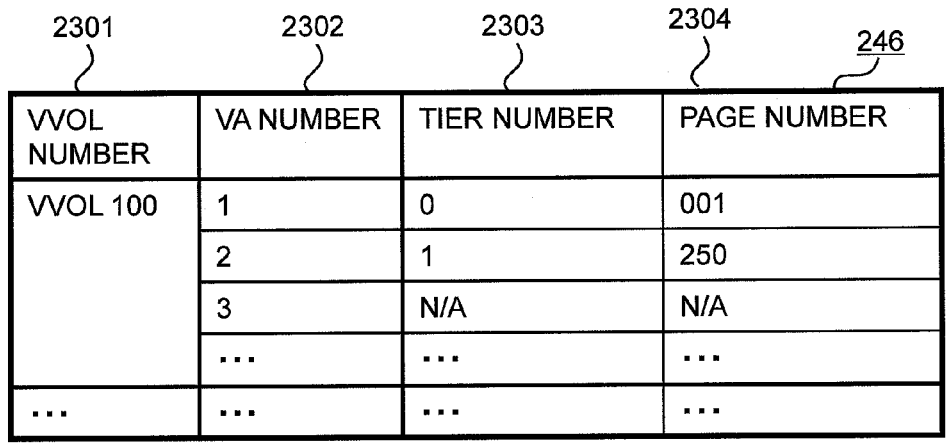
FIG. 23 shows a mapping table 246.

FIG. 23 shows the mapping table 246.

The mapping table 246, for example, for each virtual area, comprises the information below.

VVOL number 2301: the identification number of the VVOL comprising the virtual area.

VA number 2302: the identification number of the virtual area.

Tier number 2303: the identification number of the tier comprising the page assigned to the virtual area.

Page number 2304: the identification number of the page assigned to the virtual area.

This table 246 shows that, for example, the page 001 in the tier 0 is assigned to the virtual area 1 in the VVOL 100. Furthermore, for example, this table 246 shows that none of the pages are assigned to the virtual area 3 in the VVOL 100 ("N/A" is an abbreviation of Not Allocated).

Figure 24:
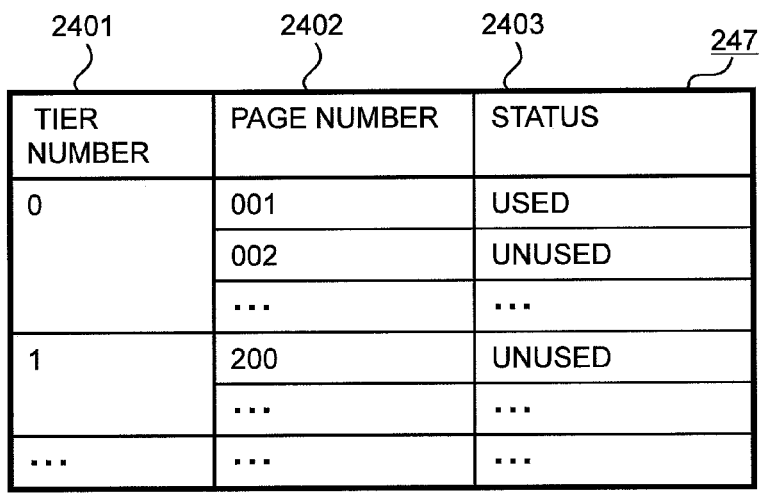
FIG. 24 shows a pool management table 247.

FIG. 24 shows the pool management table 247.

The pool management table 247, for example, for each page, comprises the information below.

Tier number 2401: the identification number of the tier comprising the page.

Page number 2402: the identification number of the page.

Status 2403: shows whether the page is being used (already assigned) or unused (unassigned).

This table 247 shows, for example, that the page 001 in the tier 0 is being used. Furthermore, for example, this table 247 shows that the page 200 in the tier 1 is being unused.

Note that, though not shown in the figure, the association of the page with the actual storage location is managed separately. For example, it is assumed that a logical volume (logical storage device) is created based on a RAID group, that a medium is configured of one or more logical volumes, that each logical volume is configured of multiple pages and, at the same time, what logical volume corresponds to what address range of what RAID group is managed. In this case, with reference to the page location (address) in the logical volume, it can be ascertained in which of the multiple disks 222 configuring the RAID group the data stored in the page is actually stored.

The description of the respective tables stored in the non-volatile memory 230 is as above.

Hereinafter, the write processing and the read processing performed in the storage apparatus 101 are described. In the write processing and the read processing, when access occurs in a page assigned to a virtual area, the access frequency of the page is updated.

<Write Processing>

(a1) The page allocation program 236 receives a write command from the operation in the host computer 102.

(a2) The program 236, with reference to the access destination information which the write command comprises, identifies the write destination VVOL and the write destination virtual area. The access destination information is the information showing the access destination and, for example, comprises the VVOL number and the LBA of the virtual area.

(a3) The program 236 stores the write target data complying with the write command in the cache memory 215. The program 236, at this step, may respond the write completion to the host computer 102.

(a4) The program 236, with reference to the mapping table 246, determines whether a page is assigned to the write destination virtual area identified at the (a2) above or not.

(a5) If the result of the determination at the (a4) above is positive, the program 236 writes the write target data in the cache memory 215 to the page assigned to the write destination virtual area.

(a6) If the result of the determination at the (a4) above is negative, the program 236, with reference to the pool management table 247, identifies the unused pages in the pool (the pages which are not assigned to any virtual areas). At this point, the program 236 may identify the unused page in the highest available tier.

(a7) The program 236 makes the page identified at the (a6) above correspond to the write destination virtual area. As more specifically described, for example, the program 236, to the mapping table 246, as the tier number 2303 and the page number 2304 corresponding to the write destination virtual area, registers the number of the tier comprising the assigned page and the number of the page. Furthermore, for example, the program 236, to the pool management table 247, as the status 2403 corresponding to the assigned page, registers "Used."

(a8) The program 236, to the page identified at the (a6) above, write the write target data in the cache memory 215 (the program 236, at this step, may respond the write completion to the host computer 102).

(a9) The page performance measurement program 233, at the (a5) or the (a8) above, updates the TOPS 803 corresponding to the write destination virtual area in the page performance management table 240 corresponding to the operation of the transmission source of the write command.

<Read Processing>

(b1) The page allocation program 236 receives a read command from the operation in the host computer 102.

(b2) The program 236, with reference to the access destination information which the read command comprises, identifies the read source VVOL and the read source virtual area.

(b3) The program 236 determines whether the read target data remains in the cache memory 215 or not.

(b4) If the result of the determination at the (b3) above is positive, the program 236 transmits the read target data in the cache memory 215 to the host computer 102. In this case, the IOPS 803 of the page assigned to the read source virtual area (IOPS 803 in the table 240 corresponding to the operation of the transmission source of the read command) is not updated.

(b5) If the result of the determination at the (b3) above is negative, the program 236, with reference to the mapping table 236, determines whether a page is assigned to the read source virtual area identified at the (b2) above or not.

(b6) If the result of the determination at the (b5) above is negative, the program 236 transmits specified data (e.g. an error) to the operation in the host computer 102.

(b7) If the result of the determination at the (b5) above is positive, the program 236 reads the data from the page assigned to the read source virtual area, and writes the data to the cache memory 215. Then, the program 236 transmits the data in the cache memory 215 to the operation in the host computer 102.

(b8) The page performance measurement program 233, at the (b6) above, updates the IOPS 803 corresponding to the read source virtual area in the page performance management table 240 corresponding to the operation of the transmission source of the read command.

As described above, in this embodiment, four types of reallocation processing, which are the reallocation processing 0, 1, 2, and 3 are performed. Which type of reallocation processing among the types of reallocation processing 0 to 3 should be performed can be determined and set by the administrator in advance.

The reallocation processing 0 is the processing of, in cases where it is detected that the access frequency of a page does not belong to the access frequency range corresponding to the medium comprising the page (that the data allocation is not appropriate), migrating the data in the page to the page in the medium corresponding to the access frequency range to which the access frequency of the page belongs.

The reallocation processing 1 is the processing of, with reference to the past actual allocation history, restoring the data allocation at the point of time desired by the administrator (or the time zone to which the point of time belongs).

The reallocation processing 2 is the processing of, with reference to the past access frequency history, realizing an ideal data allocation at the point of time desired by the administrator (or the time zone to which the point of time belongs).

Among the reallocation direction (UP) and the reallocation direction (DOWN), the reallocation processing 3 is performed only for the reallocation direction (UP). That is, the reallocation processing 3 is the processing of, before the access frequency of a page becomes higher, automatically migrating the data in the page to the tier of the higher performance. As for the reallocation direction (DOWN), the reallocation processing 3 is not performed, and the reallocation processing 0 is performed, for example. By this method, both the frequency of performing data migration (load on the storage apparatus 101) and the possibility that the increase of the access frequency deteriorates the access performance can be inhibited. As a variation example, the reallocation processing 3 may also be performed for the reallocation direction (DOWN). That is, before the access frequency of a page decreases, the data in the page may also be automatically migrated to the tier of the lower performance.

Figure 14:
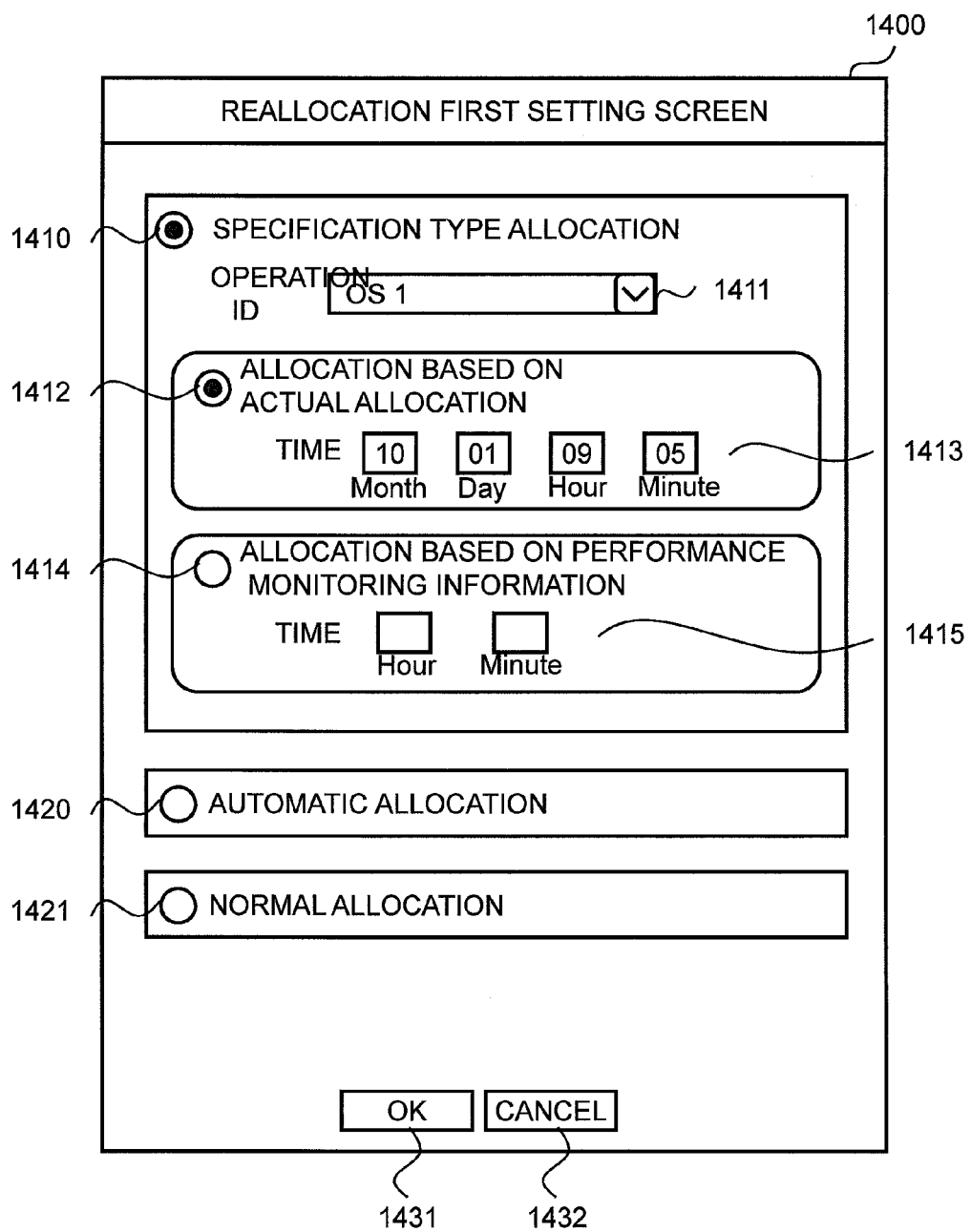
FIG. 14 shows a page reallocation setting screen 1400 displayed on the management computer 103.

For setting which type of reallocation processing among the types of reallocation processing 0 to 3 should be performed, for example, the screen shown in FIG. 14 is utilized.

FIG. 14 shows the page reallocation setting screen 1400 displayed on the management computer 103.

This screen 1400 is displayed on the output device 307 by the UI control program 311. This screen 1400, for example, comprises selection buttons 1410, 1412, 1414, 1420, 1421, a selection bar 1411, input parts 1413, 1415, buttons 1431, and 1432.

The selection buttons 1410 and 1420 are for making the administrator select the method for the storage apparatus 101 reallocating the page.

The specification type allocation of the selection button 1410 is selected in cases where the administrator instructs the operation ID and the time of reallocation to the storage apparatus 101.

Meanwhile, the automatic type allocation of the selection button 1420 is selected in cases where the administrator does not instruct reallocation to the storage apparatus 101, and the storage apparatus 101 operates independently.

The administrator, if selecting the selection button 1410, can select and input the selection bar 1411 and the input parts [from 1412] to 1415 but, if selecting the selection button 1420, cannot select or input the selection bar 1411 and the input parts [from 1412] to 1415.

The selection bar 1411 is for making the administrator select the operation which is the target of the setting.

The selection buttons 1412 and 1414 are the buttons for making the administrator select on what information as the base the storage apparatus 101 should perform page reallocation (that is, the buttons for specifying which of the reallocation processing 1 and [reallocation processing] 2 to select).

The reallocation by the selection buttons 1412 based on the actual allocation is selected in cases where the administrator returns [the page] to the page allocation at a certain point of time.

The reallocation by the selection buttons 1414 based on performance monitoring is selected in cases where the administrator makes the page allocation at a certain point of time operate in accordance with the ideal tier management table 242 in the storage apparatus 101.

The input part 1413 is for making the administrator specify the point of time to which [the administrator] desires to return the tier allocation.

The input part 1415 is for making the administrator specify the point of time at which [the administrator] desires for the ideal tier allocation.

The button 1431 is for determining the information which is input to the screen 1400 by the administrator.

The button 1432 is for cancelling the information which is input to the screen 1400 by the administrator.

In this embodiment, for each operation, for example, as described below, which type of reallocation processing among the types of reallocation processing 0 to 3 should be performed can be selected.

For only the reallocation processing 0 to be performed among the reallocation processing 0 to 3, the administrator selects "normal allocation."

For the reallocation processing 1 to be performed, the administrator selects "specification type allocation" and "allocation based on actual allocation."

For the reallocation processing 2 to be performed, the administrator selects "specification type allocation" and "allocation based on performance monitoring information."

For the reallocation processing 3 to be performed, the administrator selects "automatic type allocation."

The screen 1400 is not limited to the configuration shown in FIG. 14. For example, instead of or in addition to the selection buttons (radio buttons) and the selection bar (pull-down menu), other types of input tools may also be adopted.

The storage communication program 312 transmits the setting information selected and input by the administrator (the information specified via the screen 1400) to the storage apparatus 101. The CPU 213 of the storage apparatus 101 (operation management program 231) registers the setting information received from the management computer 103 to the operation management table 237, and performs the selection processing of the reallocation processing.

Hereinafter, various types of processing performed in this embodiment are described in details.

<Selection Processing of Reallocation Processing>

Figure 15:
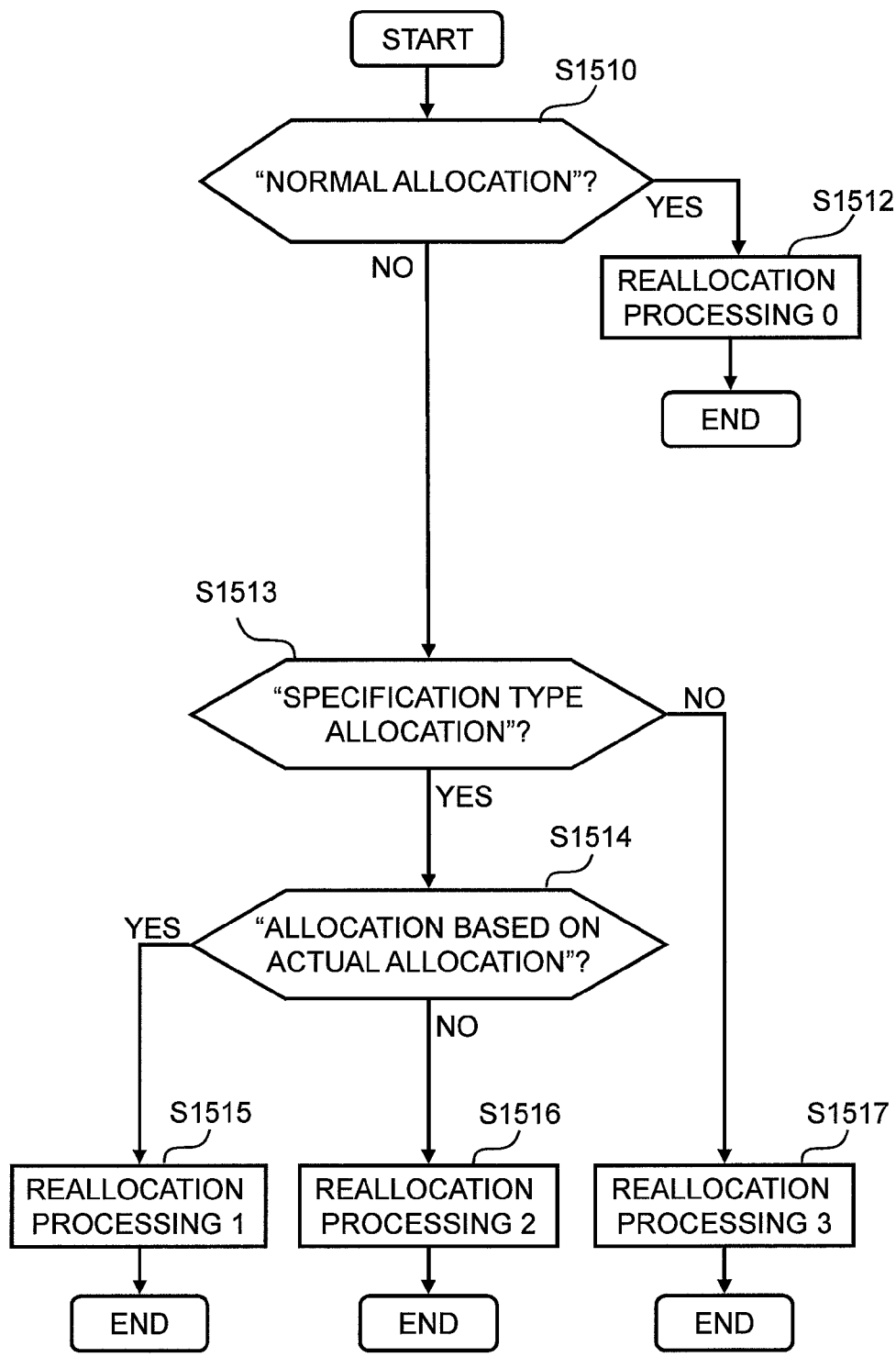
FIG. 15 is a flowchart showing a selection processing in a reallocation processing.

FIG. 15 is a flowchart showing the selection processing of the reallocation processing. Through each flowchart hereinafter, though each flowchart shows the overview of each processing to the extent necessary for understanding and realizing this invention, the order of the processing may not have to be limited to the order shown in this figure. Note that, in the description below, the step is abbreviated to "S."

This selection processing is performed for each operation. Hereinafter, one operation is described as an example (referred to as a "target operation" in the description of FIG. 15).

The operation management program 231 determines whether the information indicating that "normal allocation" is selected is included in the setting information received from the management computer 103 or not (S1510).

If the result of the determination at S1510 is positive (S1510: YES), the program 231 registers the information indicating the reallocation processing 0 as the reallocation type 504 to the row including the target operation ID in the operation management table 237 (S1511).

If the result of the determination at S1510 is negative (S1510: NO), the program 231 determines whether the information indicating that "specification type allocation" is selected is included in the above-mentioned setting information or not (S1513).

If the result of the determination at S1513 is negative (S1513: NO), the program 231 registers the information indicating the reallocation processing 3 as the reallocation type 504 to the row including the target operation ID in the operation management table 237 (S1517).

If the result of the determination at S1513 is positive (S1513: YES), the program 231 determines whether the information indicating that "allocation based on actual allocation" is selected is included in the above-mentioned setting information or not (S1514).

If the result of the determination at S1514 is positive (S1514: YES), the program 231 registers the information indicating the reallocation processing 1 and the specified time as the reallocation type 504 to the row including the target operation ID in the operation management table 237 (S1515).

If the result of the determination at S1514 is negative (S1514: NO), the program 231 registers the information indicating the reallocation processing 2 and the specified time as the reallocation type 504 to the row including the target operation ID in the operation management table 237 (S1516).

<Page Migration in Reallocation Processing 0 to 3>

Page migration is performed in all the types of reallocation processing 0 to 3, and the details of the page migration are as described below.

The page allocation program 236 migrates data from a migration source page to an arbitrary unused page in a tier different from the tier comprising the migration source page (migration destination page).

The program 236 assigns the migration destination page, instead of the migration source page, to the virtual area assigned to the migration source page (hereinafter referred to as the target virtual area). As more specifically described, for example, the program 236, in the mapping table 246, updates the tier number 2303 and the page number 2304 corresponding to the target virtual area number 2302 from the tier [number] and the page number of the migration source to the tier [number] and the page number of the migration destination. Furthermore, the program 236, in the page management table 241, updates the status 2403 corresponding to the migration source page to "unused" and, at the same time, updates the status 2403 corresponding to the migration destination page to "Used."

Note that, if, for example, the migration destination page is accessed after the page migration, the value indicated by the IOPS 803 corresponding to the target virtual area in the page performance management table 240 increases.

<Processing Related to Reallocation Processing 0>

<<Determining Whether Performing Reallocation Processing 0 Is Timely>>

The page allocation program 236, for the operation corresponding to performing the reallocation processing 0, performs the reallocation processing 0, but determines whether performing the reallocation processing 0 is timely or not. As more specifically described, for example, the program 236, with reference to the page performance management table 240 and the tier determination criteria table 241, determines whether a page storing the data allocated in an inappropriate tier exists or not. As even more specifically described, for example, the program 236 determines whether a page whose access frequency does not belong to the access frequency range corresponding to the tier exists in the tier or not.

<<Reallocation Processing 0>>

The program 236, if the result of the above-mentioned determination of whether performing the processing is timely or not is positive, performs the reallocation processing 0. That is, the program 236 performs the page migration in which the data in the migration source page is migrated to an unused page in a tier corresponding to the access frequency range to which the access frequency of the page belongs.

<Processing Related to Reallocation Processing 1>

<<Tier Monitoring Processing>>

As the processing related to the reallocation processing 1, the tier monitoring processing exists. In the tier monitoring processing, the actual allocation is identified, and the actual allocation history management table 239 is updated. The tier monitoring processing may be performed only for the operation for which the reallocation processing 1 is selected to be performed, and may also be performed for the operation for which the reallocation processing 1 is not selected to be performed.

Figure 16:
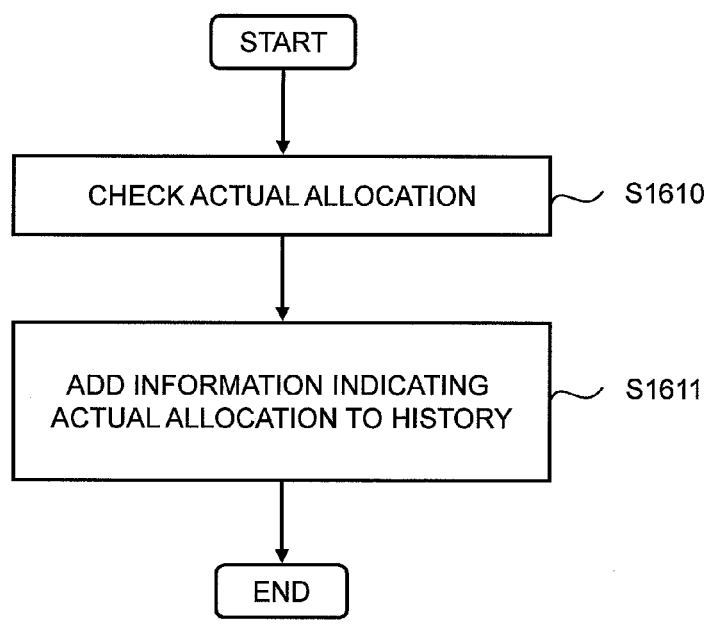
FIG. 16 is a flowchart showing the tier monitoring processing.

FIG. 16 is a flowchart showing the tier monitoring processing.

The tier monitoring processing is started regularly (in this embodiment, every five minutes).

The tier monitoring program 232, with reference to the operation management table 237 and the mapping table 246, detects in what virtual area for what operation the page in what tier is assigned (S1610).

The program 232, with reference to the result of the detection at S1610, updates the actual allocation history management table 239. As more specifically described, for example, the program 232, in the tier monitoring processing started at 2009/10/01/08/55, adds a row corresponding to the point of time "2009/10/01/08/55" to the table 239 corresponding to the respective operations. Furthermore, the program 232, for example, if identifying that the page in the tier 2 is assigned to the virtual area 1 in the VVOL 100, registers the VA number "1" and the tier number "2" to the fields corresponding to the time "2009/10/01/08/55" in the actual allocation history management table 239 of the 051.

Note that the program 232, if the number of rows in the actual allocation history management table 239 reaches the upper limit value which is previously specified, may delete one or more rows (e.g. the row corresponding to the oldest point of time).

<Reallocation Processing 1>

Figure 17:
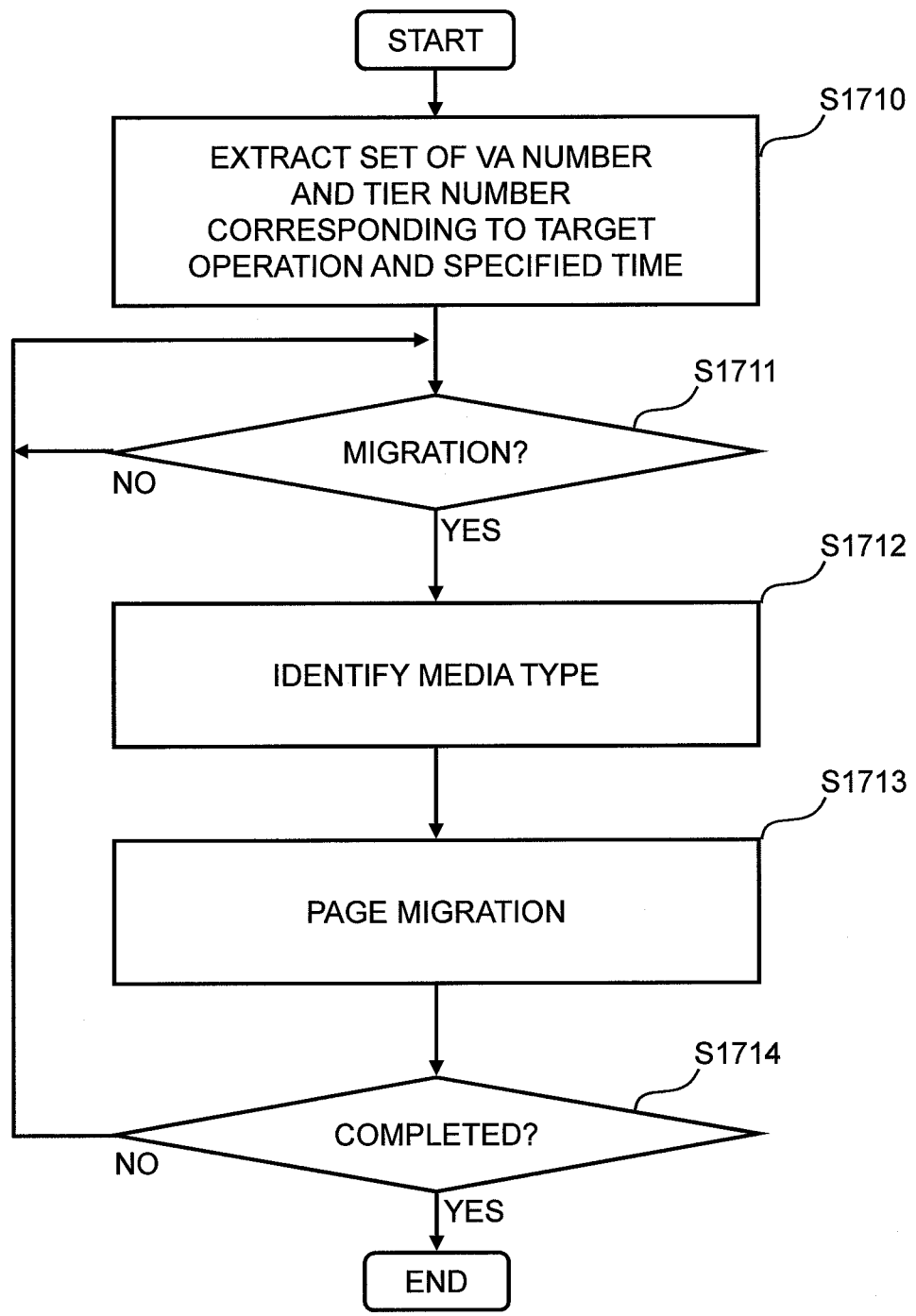
FIG. 17 is a flowchart showing a reallocation processing 1.

FIG. 17 is a flowchart showing the reallocation processing 1.

The reallocation processing 1 is started if, for the operation for which performing the reallocation processing 1 is made to correspond in the operation management table 237 (hereinafter referred to as the "target operation" in the description of FIG. 17), the current time is detected to have reached the specified point of time corresponding to the target operation (the point of time specified by the administrator). Note that, while the reallocation processing 1 is not performed, for example, whether performing the reallocation processing 0 is timely or not may be determined regularly.

The page allocation program 236 extracts the VA number 702 and the tier number 703 matching the specified point of time from the actual allocation history management table 239 corresponding to the target operation (S1710).

For each set of numbers (set of the VA number 702 and the tier number 703) extracted at S1710, the program 236 performs the S1711 described below.

At S1711, the program 236 determines whether the page migration is required or not. As more specifically described, for example, the program 236 determines whether the tier comprising the page currently assigned to the virtual area indicated by the VA number 702 (the tier identified by the mapping table 246) and the tier indicated by the tier number 703 are different or not. If [the tiers are] different, page migration is required while, if [the tiers are] the same, page migration is not required.

If the result of the determination at S1711 is negative (S1711: NO), the program 236 performs S1714.

If the result of the determination at S1711 is positive (S1711: YES), the program 236, with reference to the tier-media management table 238, identifies the media type corresponding to the tier indicated by the tier number 702 (S1712).

At S1713, the program 236 performs the page migration. In this page migration, the migration source page is the page assigned to the VA number 702 (the page identified from the mapping table 246), and the migration destination page is an arbitrary unused page in the tier indicated by the tier number 703 (the page identified from the pool management table 247).

If the S1711 is not performed for all the sets of numbers extracted at S1710 (S1714: NO), the program 236 performs the S1711 for the sets of numbers for which the S1711 is not performed. Meanwhile, if the S1711 is performed for all the sets of numbers extracted at S1710 (S1714: YES), this processing is completed.

<Processing Related to Reallocation Processing 2>

As the processing related to the reallocation processing 2, the ideal tier determination processing exists. In the ideal tier determination processing, the ideal tier management table 242 is created in accordance with the trend based on the access frequency history. The ideal tier determination processing may be performed only for the operation for which the reallocation processing 2 is selected to be performed, and may also be performed for the operation for which the reallocation processing 2 is not selected to be performed.

<<Ideal Tier Determination Processing>>

Figure 18:
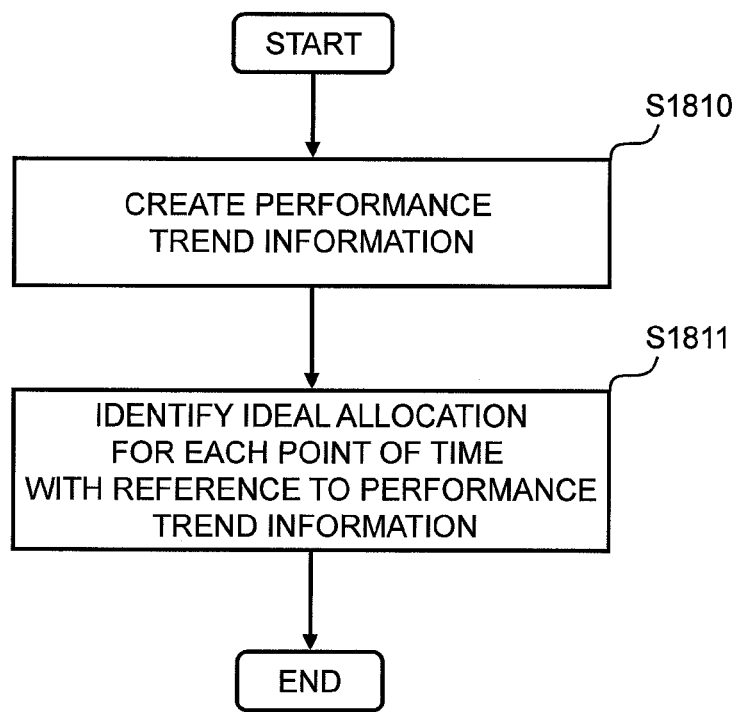
FIG. 18 is a flowchart showing an ideal tier determination processing.

FIG. 18 is a flowchart showing the ideal tier determination processing.

The ideal tier determination program 234 identifies the regularity of the performance variation (performance trend) from the page performance management table 240, and creates a model showing the regularity (performance trend information) (S1810). The performance trend information is, for example, the information indicating the average of the access frequency of each virtual area in each time zone (e.g. every five minutes) in a certain period of time in the past (e.g. a week). The table which is an example of the performance trend information is shown in FIG. 25. This table 2500 exists for each OS and, for each point of time 2501, comprises the VA number 2502 and the average IOPS 2503.

Next, the program 234, with reference to the performance trend information and the tier determination criteria table 241, determines the most appropriate tier for each point of time and each virtual area, and registers the result of the determination to the ideal tier management table 242 (S1811). For example, in the table shown in FIG. 25, as the IOPS corresponding to the OS 1, the VVOL 100, the point of time 08:55, and the virtual area 1 is 25, it is determined to be ideal that the page where the data in the virtual area 1 is stored should be in the tier 0 corresponding to the access frequency range to which the 25 IOPS belongs, and the result of the determination is, as shown in FIG. 10, registered to the ideal tier management table 242 of the OS 1.

Note that the program 234, if the number of rows in the ideal tier management table 242 reaches the upper limit value which is previously specified, may delete one or more rows.

<<Reallocation Processing 2>>

Figure 19:
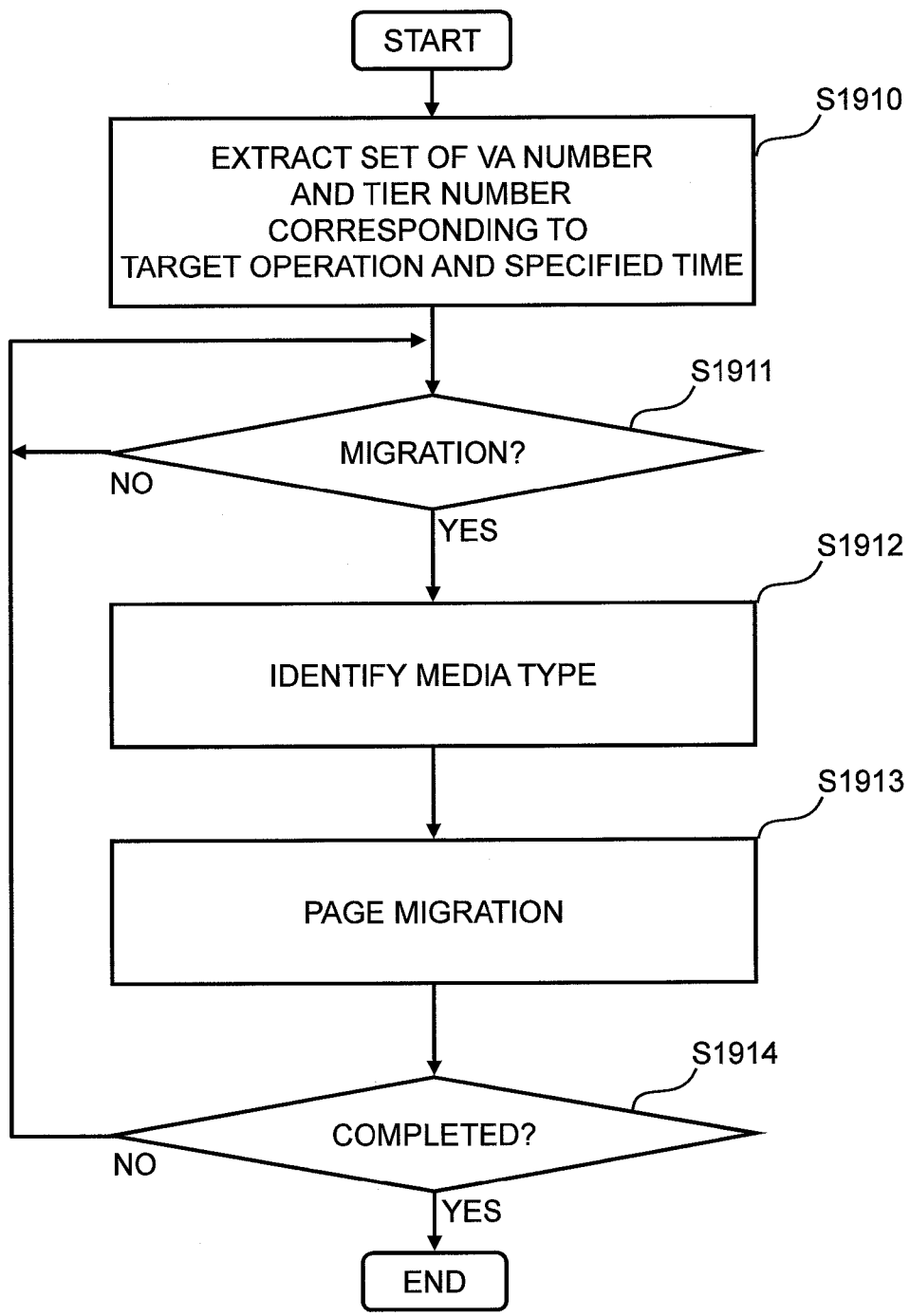
FIG. 19 is a flowchart showing a reallocation processing 2.

FIG. 19 is a flowchart showing the reallocation processing 2.

The reallocation processing 2 is started if, for the operation for which performing the reallocation processing 2 is made to correspond in the operation management table 237 (hereinafter referred to as the "target operation" in the description of FIG. 19), the current time is detected to have reached the specified point of time corresponding to the target operation (the point of time specified by the administrator). Note that, while the reallocation processing 2 is not performed, for example, whether performing the reallocation processing 0 is timely or not may be determined regularly.

The page allocation program 236 extracts the VA number 1002 and the tier number 1003 matching the specified point of time from the ideal tier management table 242 corresponding to the target operation (S1910).

For each set of numbers (set of the VA number 1002 and the tier number 1003) extracted at S1910, the program 236 performs the S1911 described below.

At S1911, the program 236 determines whether the page migration is required or not. As more specifically described, for example, the program 236 determines whether the tier comprising the page currently assigned to the virtual area indicated by the VA number 1002 (the tier identified by the mapping table 246) and the tier indicated by the tier number 1003 are different or not. If [the tiers are] different, page migration is required while, if [the tiers are] the same, page migration is not required.

If the result of the determination at S1911 is negative (S1911: NO), the program 236 performs S1914.

If the result of the determination at S1911 is positive (S1911: YES), the program 236, with reference to the tier-media management table 238, identifies the media type corresponding to the tier indicated by the tier number 1002 (S1912).

At S1913, the program 236 performs the page migration. In this page migration, the migration source page is the page assigned to the VA number 1002 (the page identified from the mapping table 246), and the migration destination page is an arbitrary unused page in the tier indicated by the tier number 1003 (the page identified from the pool management table 247).

If the S1911 is not performed for all the sets of numbers extracted at S1910 (S1914: NO), the program 236 performs the S1911 for the sets of numbers for which the S1911 is not performed. Meanwhile, if the S1911 is performed for all the sets of numbers extracted at S1910 (S1914: YES), the program 236 completes this processing.

<<Processing Related to Reallocation Processing 3>>

As the processing related to the reallocation processing 3, the above-mentioned ideal tier determination processing and the reallocation start time ascertaining processing described later exist. In the reallocation start time ascertaining processing, with reference to the ideal tier management table 242 and the actual allocation performance management table 243, for each point of time and each reallocation direction (UP), a reallocation start time is ascertained. The reallocation start time ascertaining processing may be performed only for the operation for which the reallocation processing 3 is selected to be performed, and may also be performed for the operation for which the reallocation processing 3 is not selected to be performed.

Figure 20:
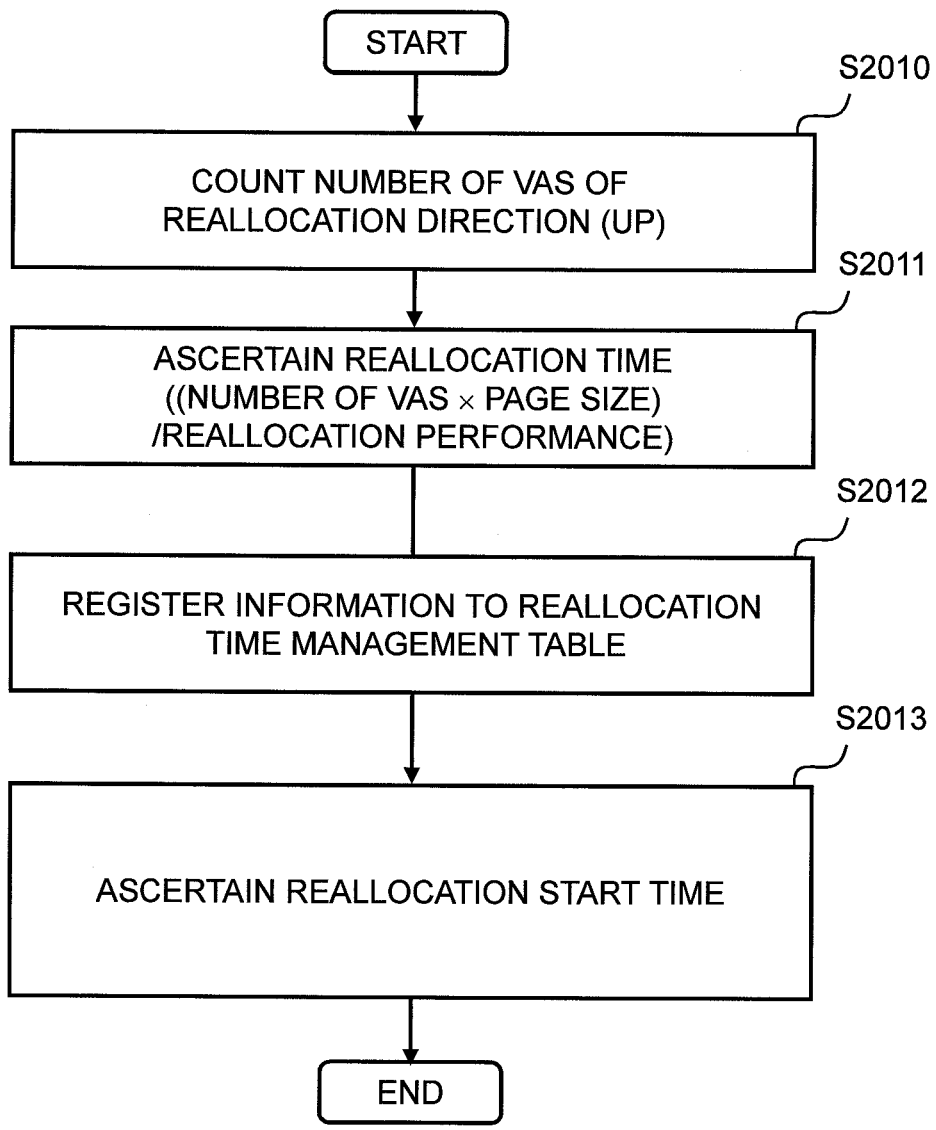
FIG. 20 is a flowchart showing a reallocation start time ascertaining processing.

FIG. 20 is a flowchart showing the reallocation start time ascertaining processing.

The reallocation start time ascertaining processing is started regularly, for example.

The reallocation start time management program 236, with reference to the ideal tier management table 242 and the mapping table 246, for each point of time, counts the number of virtual areas whose ideal tiers are higher than the current tiers (S2010). As more specifically described, for example, the processing described below is performed.

The program 236, with reference to the mapping table 246, identifies the current tier corresponding to each virtual area.

The program 236, with reference to the ideal tier management table 242, identifies the ideal tier corresponding to each virtual area by points of time 1001 (S2010).

The program 236, for each point of time 1001, counts the number of virtual areas whose ideal tiers are higher than the current tiers. At that step, the number of virtual areas is counted by types of reallocation direction (UP). For example, the virtual area corresponding to the tier 2 as the current tier and the tier 1 as the ideal tier is counted for the reallocation direction (UP) "2→1," and the virtual area corresponding to the tier 2 as the current tier and the tier 0 as the ideal tier is counted for the reallocation direction (UP) "2→0."

Next, the program 236, with reference to the reallocation performance management table 243, for each point of time and each reallocation direction (UP), ascertains the reallocation time (S2011). At this point, for example, the reallocation time (seconds) for one reallocation direction (UP) is ascertained by the expression below.

Reallocation time (seconds)={(the number of counted virtual areas (that is, the number of pages to be the migration source))×(the size of a page)}/(the value indicated by the reallocation performance 1102 corresponding to the reallocation direction (UP)).

Next, the program 236 registers the point of time 1201 and the reallocation direction (UP) 1202 to the reallocation time management table 244 and, at the same time, for each point of time 1201 and each reallocation direction (UP), registers the counted number of virtual areas (number of VAs) 1203 and the ascertained reallocation time 1204 to the table 244 (S2012).

Next, the program 236 creates the reallocation start time management table 245 (S2013). As more specifically described, for example, the processing described below is performed.

The program 236, for each point of time 1201, for each reallocation direction (UP) 1202, ascertains the reallocation start time 1301 which is the point of time earlier than the point of time indicated by the time 1201 by the length of time indicated by the reallocation time 1204.

The program 236 registers each set of the reallocation direction 1302 and the reallocation start time 1301 to the table 245.

The program 236, for each reallocation direction 1302 and each reallocation start time 1301, registers the VA number 245. The VA number 245 is a list of numbers of the virtual areas to be the target of the reallocation processing 3. The number of this virtual area is the number of the virtual areas counted at S2010.

<<Reallocation Processing 3>>

Figure 21:
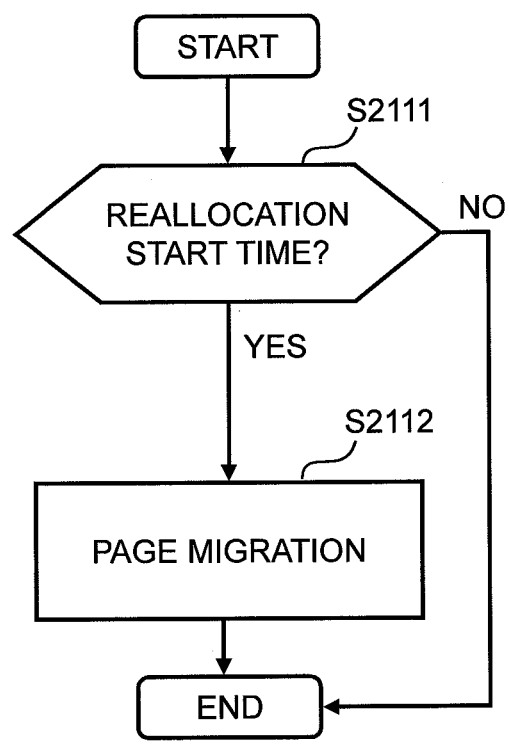
FIG. 21 is a flowchart showing a reallocation processing 3.

FIG. 21 is a flowchart showing the reallocation processing 3.

The reallocation processing 3 is started regularly for the operation for which performing the reallocation processing 3 is made to correspond in the operation management table 237 (hereinafter referred to as the "target operation" in the description of FIG. 21). The time interval of starting this processing is, for example, shorter than the interval of the time 1001 recorded to the ideal tier management table 242 (every five minutes according to FIG. 10).

The page allocation program 236 determines whether the current time reaches the time indicated by the earliest reallocation start time 1301 in the reallocation start time management table 245 or not (S2111).

If the result of the determination at 52111 is positive (S2111: YES), the program 236 performs the page migration for the respective virtual areas indicated by the VA number 1303 corresponding to the above-mentioned earliest reallocation start time 1301. In each set of page migration, the migration source page is the page assigned to the virtual area indicated by the VA number 1303 (the page identified by the mapping table 246), and the migration destination page is an arbitrary unused page in the migration destination tier complying with the reallocation direction 1302 corresponding to the above-mentioned earliest reallocation start time 1301 (the page identified from the pool management table 247). If all the sets of page migration for the above-mentioned earliest reallocation start time 1301 are completed, the program 236 deletes the row corresponding to the start time 1301 from the reallocation start time management table 245. By this method, the next earliest reallocation start time 1301 becomes the earliest reallocation start time 1301.

The description of the reallocation processing 3 is as above.

Note that, while the reallocation processing 3 is not performed and/or if the result of the determination at S2111 is negative, for example, whether performing the reallocation processing 0 is timely or not may be determined.

Furthermore, for the operation for which the reallocation processing 3 is selected to be performed, for each reallocation direction 1302, for example, the processing described below may be performed.

(Processing A) Since the reallocation start time ascertaining processing is started until the page migration corresponding to the reallocation direction 1302 is completed, for the virtual area related to the page migration, the reallocation processing 0 may not have to be performed. This is because, if the reallocation processing 0 is performed in that period, to the virtual area, the page in a tier different from the migration source tier indicated by the reallocation direction 1302 is assigned. For example, the virtual area 1 shown in FIG. 13 corresponding to the reallocation start time 1301 "08:50" and the reallocation direction 1302 "2→0" is described. Even if the access frequency of the page assigned to the virtual area 1 stops belonging to the access frequency range of the tier 2 before 8:50 (even if it becomes timely to perform the reallocation processing 0), the reallocation processing 0 may not have to be performed for the virtual area 1.

(Processing B) Since the reallocation start time ascertaining processing is started until the page migration corresponding to the reallocation direction 1302 is completed, if the access frequency of the virtual area related to the page migration stops belonging to the access frequency range corresponding to the tier comprising the page assigned to the virtual area (if it becomes timely to perform the reallocation processing 0), for the virtual area, even before the reallocation start time 1301, the page migration to the migration destination tier complying with the reallocation direction 1302 may be performed. In this case, the number of the virtual area for which the page migration is already performed may be deleted from the VA number 1303.

This embodiment is as described above.

According to the reallocation processing 1, the past time data allocation in the time zone to which the point of time desired by the administrator (specified time) belongs, for the operation desired by the administrator (specified operation), started to be restored to the specified time. Therefore, before the access frequency changes after the specified time (e.g. before the access frequency becomes higher as the specified operation is activated), the data allocation appropriate for the changed access frequency can be expected to be realized.

According to the reallocation processing 2, the migration processing for realizing the ideal data allocation in the time zone to which the specified time belongs is started at the specified time. Therefore, before the access frequency changes after the specified time, the data allocation appropriate for the changed access frequency can be expected to be realized.

According to the reallocation processing 3, for ensuring that the ideal data allocation is realized at the specified time, the migration processing for realizing the ideal data allocation is started at an earlier point of time than the specified time. By this method, the possibility that the data allocation appropriate for the changed access frequency is realized before the access frequency changes becomes higher.

Though an embodiment of this invention is described above, this invention is not limited to this embodiment and, as a matter of course, also comprises any changes or modifications within the spirit and scope hereof.

For example, before a certain length of time before the specified time for the reallocation processing 1 (the point of time specified by the administrator), the reallocation start time ascertaining processing may also be performed. In this case, the reallocation processing 1 may also be started at the reallocation start time instead of the specified time. By this method, at the point of the specified time, the actual allocation at the same time as the specified time may also be restored. Note that, for an operation for which the reallocation processing 1 is supposed to be performed, since the reallocation start time ascertaining processing is started until the reallocation processing 1 is completed, either the (Processing A) or the (Processing B) described above regarding the reallocation processing 3 may be applied. Furthermore, the reallocation start time ascertaining processing and the start of the migration at an earlier point of time than the specified time may also be performed only in the reallocation direction (UP). As for the reallocation direction (DOWN), the migration may also be started at the specified time.

Furthermore, for example, before a certain length of time before the specified time for the reallocation processing 2 (the point of time specified by the administrator), the reallocation start time ascertaining processing may also be performed. In this case, the reallocation processing 2 may also be started at the reallocation start time instead of the specified time. By this method, at the point of the specified time, the ideal data allocation at the same time as the specified time may also be realized. Note that, for an operation for which the reallocation processing 2 is supposed to be performed, since the reallocation start time ascertaining processing is started until the reallocation processing 2 is completed, either the (Processing A) or the (Processing B) described above regarding the reallocation processing 3 may be applied. Furthermore, the reallocation start time ascertaining processing and the start of the migration at an earlier point of time than the specified time may also be performed only in the reallocation direction (UP). As for the reallocation direction (DOWN), the migration may also be started at the specified time.

Furthermore, for example, at least one of the multiple pages configuring the pool may also be based on a storage device in a storage apparatus outside the storage apparatus 101 (e.g. a physical storage device or a logical storage device based on the physical storage device (logical volume)).

Furthermore, for example, in the above-mentioned embodiment, one of the four types of reallocation processing 0 to 3 is selected but N units of the reallocation processing 0 to 3 may also be missing as the selectable types of processing other than the reallocation processing 0 (N must be an integer which is 1 or larger than 1 and smaller than 3).

REFERENCE SIGN LIST

101 Storage apparatus

The invention claimed is:
1. A storage system comprising:
a virtual volume including multiple virtual areas;
a pool which is a storage area configured of multiple actual area groups of different performances; and a controller, which receives an access command from an access source, and when an actual area has been assigned to a virtual area identified from the access command, accesses the actual area, and when an actual area has not been assigned to the identified virtual area, assigns an actual area of the pool from the pool to the identified virtual area, and accesses the assigned actual area, (A) wherein the controller is configured to manage which actual area is assigned to which virtual area and an access load of the actual area that is assigned to the virtual area, (B) wherein the controller is configured to migrate, when the access load of a first actual area assigned to a first virtual area is inappropriate for a first actual area group comprising the first actual area, data from the first actual area to a second actual area in a second actual area group, and assign the second actual area, instead of the first actual area, to the first virtual area, (C) wherein the controller is configured to manage history information, which indicates at least one of a relationship of each of the multiple virtual areas and a tier of actual area assigned to each of the multiple virtual areas at least one point of time in the past and a relationship of each of the multiple virtual areas and a tier of each of the actual areas which should be ideally assigned to each of the multiple virtual areas in at least one point of time in the past, (D) wherein the controller is configured to perform, in response to receiving an input of a certain point of time in the at least one point of time in the past, data migration between actual areas for achieving data allocation at the certain point of time in the past or ideal data allocation at the certain point of time in the past based on the history information, and wherein the data allocation is the allocation of data in a virtual area to an actual area in an actual area group.

2. A storage system according to claim 1,
wherein the history information is information indicating data allocation at a point of time in the past, and
wherein the controller is configured to restore, in step (D), the data allocation at the point of time in the past in the time zone to which the certain point of time belongs, for achieving the data allocation at the certain point of time.

3. A storage system according to claim 1,
wherein the history information is information indicating the access load of an actual area that is assigned to a virtual area for each same time zone in the past,
wherein the controller is configured to identify an access load trend by time zone for each virtual area based on the history information, and identify ideal data allocation by time zone based on the identified trend, and
wherein, in step (D), the data allocation at the certain point of time is ideal data allocation for any time in each time zone.

4. A storage system according to claim 1,
wherein there are multiple access sources,
wherein the controller is controlled to comprise access-source management information,
wherein the access-source management information is information indicating which access source is able to access which virtual area group of one or more virtual volumes, and indicating the access source for which processing of step (D) is applied, and
wherein the controller is configured to identify, from the access-source management information, an access source that is determined in advance to perform the processing of step (D) and a virtual area group that can be accessed by this access source, and perform the processing of step (D) for the identified virtual area group.

5. A storage system according to claim 4,
wherein the history information is information indicating data allocation at multiple points of time in the past,
wherein the controller is configured to receive the specification of a user-desired time and an access source, and
wherein the controller is configured to restore, in step (D), for the specified access source, data allocation at a point of time in the past in the time zone to which the user-desired time belongs.

6. A storage system according to claim 4,
wherein the history information is information indicating the access load of an actual area assigned to a virtual area for each same time zone in the past,
wherein the controller is configured to receive the specification of a user-desired time and an access source,
wherein the controller is configured to identify, for the specified access source, an access load trend by time zone for each virtual area based on the history information, and identify ideal data allocation by time zone based on the identified trend, and
wherein in step (D), the ideal data allocation in the time zone to which the user-desired time belongs is achieved for the specified access source for the data allocation at the certain point of time.

7. A storage system according to claim 4,
wherein the controller is configured to receive the specification of a user-desired access source,
wherein the controller is configured to estimate, for the specified access source, the time required for all the data migration necessary for achieving the data allocation, and
wherein the controller is configured to start, in step (D), the data migration for achieving the data allocation for the specified access source at a point of time that is earlier than the certain point of time by the estimated time.

8. A storage system according to claim 1, (E) wherein the controller is configured to estimate the time required for all the data migration necessary for achieving the data allocation, and
wherein the controller is configured to start, in step (D), the data migration for achieving the data allocation at a point of time that is earlier than the certain point of time by the estimated time.

9. A storage system according to claim 8,
wherein, in step (D), only data migration in a performance-enhancing migration direction is started at a point of time that is earlier than the certain point of time, and
wherein the performance of the actual area group comprising a migration-destination actual area is higher than that of the actual area group comprising a migration-source actual area in the performance-enhancing migration direction.

10. A storage system according to claim 8,
wherein, the controller is configured to estimate, in step (E), the time required for all the data migration for each migration direction, and
wherein, in step (D), a data migration start time exists in each migration direction, and the data migration start times in the respective migration directions are times according to the time estimated in step (E).

11. A storage system according to claim 10,
wherein, in step (D), only data migration in a performance-enhancing migration direction is started at a point of time that is earlier than the certain point of time, and wherein the performance of the actual area group comprising a migration-destination actual area is higher than that of the actual area group comprising a migration-source actual area in the performance-enhancing migration direction.

12. A storage control apparatus comprising:

a storage resource; and a processor that is coupled to the storage resource, wherein the storage resource stores information related to a virtual volume which is a virtual logical volume including multiple virtual areas, and information related to a pool which is a storage area configured of multiple actual area groups of different performances, wherein the processor is configured to receive an access command from an access source, and when an actual area has been assigned to a virtual area identified from the access command, access the actual area, and when an actual area has not been assigned to the identified virtual area, assign an actual area of the pool from the pool to the identified virtual area, and access the assigned actual area, wherein the processor is configured to manage which actual area is assigned to which virtual area and an access load of the actual area that is assigned to the virtual area, wherein the processor is configured to migrate, when the access load of a first actual area assigned to a first virtual area is inappropriate for a first actual area group comprising the first actual area data from the first actual area to a second actual area in a second actual area group, which is appropriate for the access load of the first actual area, and assign the second actual area, instead of the first actual area, to the first virtual area, wherein the processor is configured to manage history information which indicates at least one of a relation of each of the multiple virtual areas and a tier of actual area assigned to each of the multiple virtual areas at least one point of time in the past and a relation of each of the multiple virtual areas and a tier of each of the actual areas which should be ideally assigned to each of the multiple virtual areas at least one point of time in the past, wherein the processor is configured to perform, in response to receiving an input of a certain point of time among the at least one point of time in the past, data migration between actual areas for achieving data allocation at the certain point of time in the past or ideal data allocation at the certain point of time in the past based on the history information, and wherein the data allocation is the allocation of data in a virtual area to an actual area in an actual area group.

13. A storage control method of a storage system, wherein the storage system comprises a virtual volume which is a virtual logical volume including multiple virtual areas, and a pool which is a storage area including multiple actual area groups of different performances, wherein the storage system is configured to receive an access command from an access source, and when an actual area has been assigned to a virtual area identified from the access command, access the actual area, and when an actual area has not been assigned to the identified virtual area, assigning an actual area of the pool from the pool to the identified virtual area, and access the assigned actual area, and wherein the storage control method comprises the steps of:

managing history information which indicates at least one of a relation of each of the multiple virtual areas and a tier of actual area assigned to each of the multiple virtual areas at least one point of time in the past and a relation of each of the multiple virtual areas and a tier of each of the actual areas which should be ideally assigned to each of the multiple virtual areas at least one point of time in the past;

managing which actual area is assigned to which virtual area and an access load of the actual area that is assigned to the virtual area;

when the access load of a first actual area assigned to a first virtual area is inappropriate for a first actual area group comprising the first actual area, migrating data from the first actual area to a second actual area in a second actual area group, which is appropriate for the access load of the first actual area, and assigning the second actual area, instead of the first actual area, to the first virtual area; and performing data migration between actual areas for achieving data allocation at a certain point of time based on the history information, wherein the data allocation is the allocation of data in a virtual area to an actual area in an actual area group.

* * * * *